(12) United States Patent
Kanehara et al.

(10) Patent No.: US 9,894,297 B2
(45) Date of Patent: Feb. 13, 2018

(54) IMAGING DEVICE

(71) Applicant: Panasonic Intellectual Property Management Co., Ltd., Osaka (JP)

(72) Inventors: Hidenari Kanehara, Kyoto (JP);
Masashi Murakami, Kyoto (JP);
Takayoshi Yamada, Hyogo (JP);
Kazuko Nishimura, Kyoto (JP); Yasuo Miyake, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/406,824

(22) Filed: Jan. 16, 2017

(65) Prior Publication Data
US 2017/0214871 A1 Jul. 27, 2017

(30) Foreign Application Priority Data

Jan. 21, 2016 (JP) .................................. 2016-009458

(51) Int. Cl.
*H04N 5/355* (2011.01)
*H04N 5/369* (2011.01)
(Continued)

(52) U.S. Cl.
CPC ....... *H04N 5/35563* (2013.01); *H04N 5/3696* (2013.01); *H04N 5/376* (2013.01); *H04N 5/37452* (2013.01)

(58) Field of Classification Search
CPC ............ H04N 5/35563; H04N 5/3696; H04N 5/37452; H04N 5/376; H04N 5/2355; H04N 5/355; H04N 5/35536; H04N 5/235
(Continued)

(56) References Cited

U.S. PATENT DOCUMENTS 4,556,910 A * 12/1985 Tisue ................... H04N 5/2173
348/241
6,831,692 B1 12/2004 Oda
(Continued)

FOREIGN PATENT DOCUMENTS

JP 5-207376 8/1993
JP 2000-125209 4/2000
(Continued)

*Primary Examiner* — Pritham Prabhakher
(74) *Attorney, Agent, or Firm* — McDermott Will & Emery LLP

(57) ABSTRACT

An imaging device includes a pixel cell including: a first photoelectric converter that generates a first electrical signal; and a first signal detection circuit that detects the first electrical signal. The first signal detection circuit includes: a first transistor one of a source and a drain of which is electrically connected to the first photoelectric converter; a first capacitor having first and second ends, the first end being electrically connected to the other of the source and the drain of the first transistor, a reference voltage being applied to the second end; and a second transistor having a gate electrically connected to the first photoelectric converter. The pixel cell outputs, in one frame period, a first image signal and a second image signal in sequence, the first image signal being output when the first transistor is off, the second image signal being output when the first transistor is on.

11 Claims, 15 Drawing Sheets

(51) Int. Cl.
*H04N 5/3745* (2011.01)
*H04N 5/376* (2011.01)

(58) Field of Classification Search
USPC ........................................................ 348/294
See application file for complete search history.

(56) References Cited

U.S. PATENT DOCUMENTS

| | | | | |
|---|---|---|---|---|
| 8,179,459 B2* | 5/2012 | Koizumi | .............. | H04N 5/2355 348/294 |
| 8,619,170 B2* | 12/2013 | Mabuchi | ............ | H04N 5/35581 348/294 |
| 9,332,203 B2* | 5/2016 | Kinugasa | ................ | H04N 5/378 |
| 9,407,828 B2* | 8/2016 | Lee | ..................... | H04N 5/35536 |
| 9,459,078 B1* | 10/2016 | Kincel | ................. | F41G 11/004 |
| 9,736,411 B2* | 8/2017 | Guillon | ................ | H04N 5/3698 |
| 2009/0045319 A1* | 2/2009 | Sugawa | ............ | H01L 27/14609 250/208.1 |
| 2009/0180014 A1* | 7/2009 | Noda | ................... | H04N 5/3452 348/308 |
| 2011/0007196 A1* | 1/2011 | Yamashita | ........ | H01L 27/14609 348/294 |
| 2011/0032403 A1 | 2/2011 | Mabuchi | | |
| 2012/0033118 A1* | 2/2012 | Lee | ................... | H01L 27/14609 348/296 |
| 2013/0033631 A1 | 2/2013 | Mabuchi | | |
| 2014/0263950 A1* | 9/2014 | Fenigstein | ............. | H04N 5/355 250/208.1 |
| 2014/0346321 A1 | 11/2014 | Kinugasa | | |
| 2015/0189145 A1* | 7/2015 | Lee | .................... | H04N 5/35536 348/308 |
| 2015/0222836 A1* | 8/2015 | Wada | ..................... | H04N 5/378 348/222.1 |
| 2016/0155768 A1* | 6/2016 | Yi | ..................... | H01L 27/14643 250/208.1 |

FOREIGN PATENT DOCUMENTS

| | | |
|---|---|---|
| JP | 2011-040926 | 2/2011 |
| JP | 2013-034045 | 2/2013 |
| JP | 2014-230212 | 12/2014 |

\* cited by examiner

IMAGING DEVICE

BACKGROUND

1. Technical Field

The present disclosure relates to imaging devices.

2. Description of the Related Art

In recent years, suggestions have been made for achieving wider dynamic ranges in imaging devices such as CCD (charge-coupled device) image sensors and CMOS (complementary MOS) image sensors. For example, Japanese Unexamined Patent Application Publication No. 2000-125209 discloses a solid-state imaging device including high-sensitivity cells and low-sensitivity cells that are different in size from each other. Japanese Unexamined Patent Application Publication No. 2011-040926 discloses a method for obtaining two signals with different sensitivities from each pixel by performing an electronic shutter operation twice with different periods of exposure. The art disclosed in Japanese Unexamined Patent Application Publication No. 2011-040926 allows an image to be formed with an enlarged dynamic range by selecting either of the two signals for each pixel.

SUMMARY

There has been a demand for an imaging device that is simpler in structure and capable of shooting with a wide dynamic range.

One non-limiting and exemplary embodiment provides the following:

In one general aspect, the techniques disclosed here feature an imaging device including a first pixel cell including: a first photoelectric converter that generates a first electrical signal; and a first signal detection circuit that detects the first electrical signal. The first signal detection circuit includes: a first transistor having a source and a drain, one of the source and the drain being electrically connected to the first photoelectric converter; a first capacitor having a first end and a second end, the first end being electrically connected to the other of the source and the drain of the first transistor, a reference voltage being applied to the second end; and a second transistor having a gate electrically connected to the first photoelectric converter. The first pixel cell outputs, in one frame period, a first image signal and a second image signal in sequence, the first image signal being output when the first transistor is off, the second image signal being output when the first transistor is on.

It should be noted that general or specific embodiments may be implemented as an element, a device, an device, a module, a system, an integrated circuit, a method, a computer program, or any selective combination thereof. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
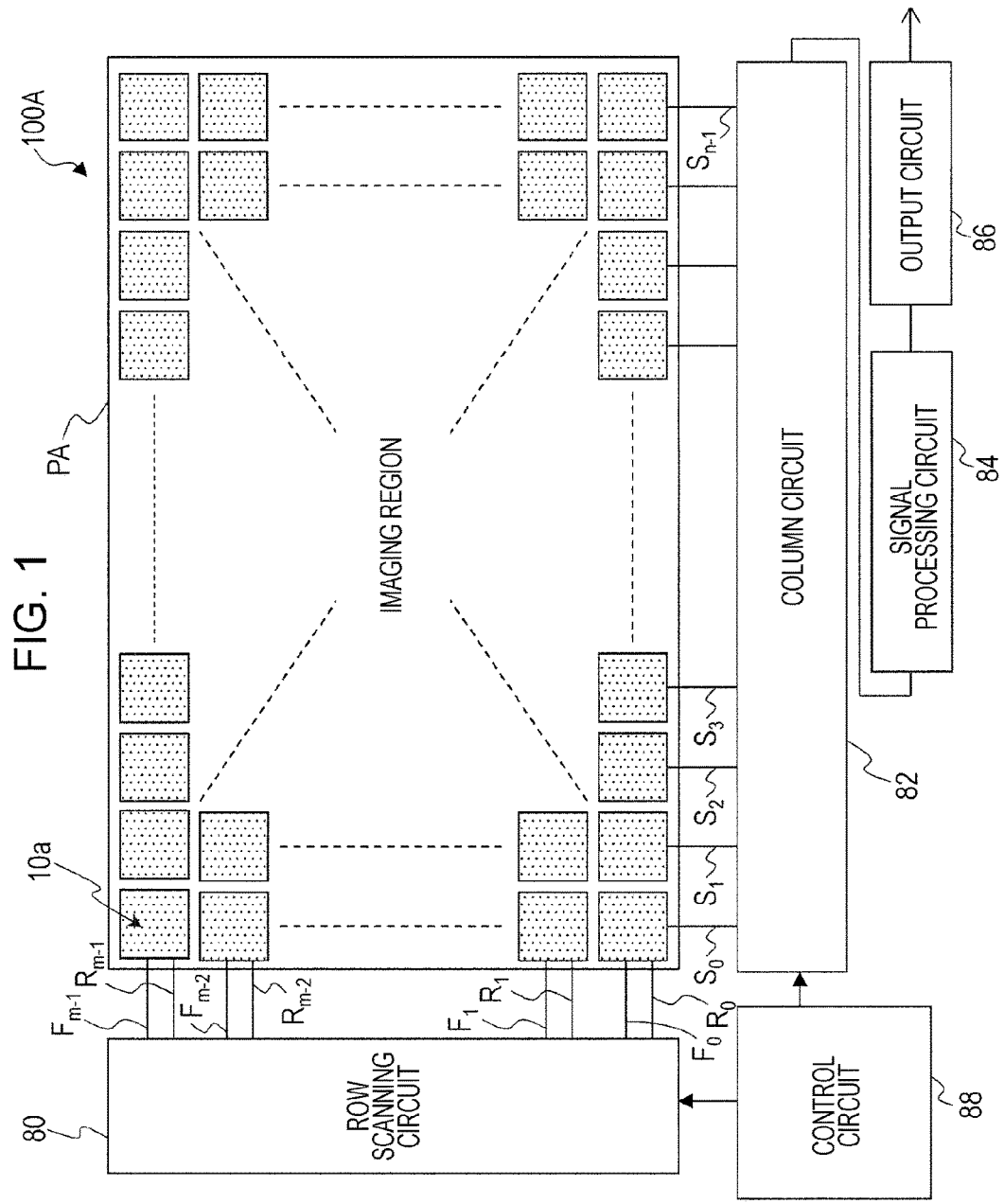
FIG. 1 is a block diagram showing an exemplary configuration of an imaging device according to a first embodiment of the present disclosure.

The art disclosed in Japanese Unexamined Patent Application Publication No. 2000-125209 requires two types of pixel cells to be formed in an imaging region. On the other hand, the art disclosed in Japanese Unexamined Patent Application Publication No. 2011-040926 allows each imaging sensor to share a common structure with the other imaging sensor but makes it necessary to separately provide a period of exposure for acquiring a high-sensitivity signal and a period of exposure for acquiring a low-sensitivity signal. This makes it impossible for the two signals, namely the high-sensitivity signal and the low-sensitivity signal, to be identical in start timing of exposure and length of the periods of exposure. This may pose a risk of deterioration in image quality. Furthermore, this requires two reset operations corresponding to the two signals, respectively.

An aspect of the present disclosure is summarized as follows:

Item 1

An imaging device comprising a first pixel cell including: a first photoelectric converter that generates a first electrical signal; and a first signal detection circuit that detects the first electrical signal, wherein the first signal detection circuit includes:

a first transistor having a source and a drain, one of the source and the drain being electrically connected to the first photoelectric converter;

a first capacitor having a first end and a second end, the first end being electrically connected to the other of the source and the drain of the first transistor, a reference voltage being applied to the second end; and a second transistor having a gate electrically connected to the first photoelectric converter, and the first pixel cell outputs, in one frame period, a first image signal and a second image signal in sequence, the first image signal being output when the first transistor is off, the second image signal being output when the first transistor is on.

The configuration of Item 1 makes it possible to individually acquire a first image signal and a second image signal from each pixel cell while performing exposure on each pixel cell only once in one frame period. The commonality between a period of exposure for the acquisition of a first image signal and a period of exposure for the acquisition of a second image signal in each image cell makes it possible to from a wide dynamic range image with reduced occurrence of deterioration in image quality.

Item 2

An imaging device comprising first pixel cells each including: a first photoelectric converter that generates a first electrical signal; and a first signal detection circuit that detects the first electrical signal, wherein the first signal detection circuit includes:

a first transistor having a source and a drain, one of the source and the drain being electrically connected to the first photoelectric converter;

a first capacitor having a first end and a second end, the first end being electrically connected to the other of the source and the drain of the first transistor, a reference voltage being applied to the second end; and a second transistor having a gate electrically connected to the first photoelectric converter, and one of the first pixel cells outputs a first image signal and other one of the first pixel cells outputs a second image signal at a same timing in one frame period, the first image signal being output when the first transistor is off, the second image signal being output when the first transistor is on.

The configuration of Item 2 enables higher operation speeds as it selectively reads out either a first image signal or a second image signal from each pixel cell in one frame period. Further, a period of exposure for acquiring a first image signal and a period of exposure for acquiring a second image signal can be made identical in length to each other.

Item 3

The imaging device according to Item 1, further comprising a second pixel cell including: a second photoelectric converter that generates a second electrical signal; and a second signal detection circuit that detects the second electrical signal, wherein the second signal detection circuit includes:

a second capacitor having a first end and a second end, the first end being electrically connected to the second photoelectric converter, a reference voltage being applied to the second end; and a third transistor having a gate electrically connected to the second photoelectric converter.

Item 4

The imaging device according to Item 1, wherein the first signal detection circuit further includes a second capacitor having a first end and a second end, the first end being electrically connected to the first photoelectric converter, the second end being electrically connected to the other of the source and the drain of the first transistor, and the second capacitor is smaller in capacitance than the first capacitor.

The configuration of Item 4 makes it possible to perform a more effective noise cancellation.

Item 5

The imaging device according to Item 1, further comprising a first feedback circuit that forms a feedback path through which a second electrical signal generated in the first photoelectric converter is negatively fed back.

The configuration of Item 5 makes it possible to reduce kTC noise.

Item 6

The imaging device according to Item 5, wherein the first feedback circuit negatively feeds back the second electrical signal to the other of the source and the drain of the first transistor.

As with the configuration of Item 4, the configuration of Item 6 brings about an effect of reducing kTC noise.

Item 7

The imaging device according to Item 5, further comprising a second pixel cell including: a second photoelectric converter that generates a third electrical signal; and a second signal detection circuit that detects the third electrical signal, the second signal detection circuit including:

a second capacitor having a first end and a second end, the first end being electrically connected to the second photoelectric converter, a reference voltage being applied to the second end; and a third transistor having a gate connected to the second photoelectric converter, and a second feedback circuit that forms a feedback path through which a fourth electrical signal generated in the second photoelectric converter is negatively fed back.

The configuration of Item 7 makes it possible to provide an imaging device that is capable of shooting with a wider dynamic range.

Item 8

The imaging device according to Item 7, wherein the second signal detection circuit includes no transistor between the second photoelectric converter and the first end of the second capacitor.

Item 9

An imaging device comprising a first pixel cell including: a first photoelectric converter that generates a first electrical signal; and a first signal detection circuit that detects the first electrical signal, wherein the first signal detection circuit includes:

a first transistor having a source and a drain, one of the source and the drain being electrically connected to the first photoelectric converter;

a first capacitor having a first end and a second end, the first end being electrically connected to the other of the source and drain of the first transistor, a reference voltage being applied to the second end; and a second transistor having a gate electrically connected to the first photoelectric converter, and the first pixel cell selectively outputs, in one frame period, either a first image signal or a second image signal according to a magnitude of the first electrical signal, the first image signal being output when the first transistor is off, the second image signal being output when the first transistor is on.

Item 10

The imaging device according to Item 9, further comprising a sensitivity switching circuit electrically connected to the first photoelectric converter, wherein the first signal detection circuit further includes a third transistor having a gate connected to the sensitivity switching circuit, the third transistor being connected, in series, to the first transistor, and the sensitivity switching circuit turns on or off the third transistor according to a magnitude of a signal output from the first pixel cell when the first transistor is off.

Item 11

The imaging device according to Item 10, wherein the sensitivity switching circuit includes a comparator that compares a magnitude of the signal output from the first pixel cell when the first transistor is off with a magnitude of a reference signal.

Embodiments of the present disclosure are described in detail below with reference to the drawings. It should be noted that all of the embodiments described below serve as general or specific examples. Numerical values, shapes, materials, constituent elements, and the locations and topology of the constituent elements, steps, the orders of the steps, and the like that are shown in the embodiment below are examples, and are not intended to limit the present disclosure. Various embodiments described herein may be combined with each other unless a contradiction arises. Those of the constituent elements in the embodiment below which are not recited in an independent claim representing the most superordinate concept are described as optional constituent elements. In the following description, constituent elements having substantially the same functions are indicated by common reference numerals, and a description thereof may be omitted.

First Embodiment

FIG. 1 shows an exemplary configuration of an imaging device according to a first embodiment of the present disclosure. An imaging device 100A shown in FIG. 1 includes a pixel array PA and peripheral circuitry. The pixel array PA includes a plurality of pixel cells 10a. The pixel cells 10a forms an imaging region, for example, by being two-dimensionally arranged on a semiconductor substrate. In this example, the pixel cells 10a are arranged in a matrix with m rows and n columns.

In the illustrated example, each of the pixel cells 10a has its center located on the grid point of a square grid. Of course, the arrangement of the pixel cells 10a is not limited to the illustrated example. For example, the pixel cells 10a may be arranged so that each of the pixel cells 10a has its center located on the grid point of a triangular grid, a hexagonal grid, or the like. The plurality of pixel cells 10a may be one-dimensionally arranged. That is, the pixel cells 10a may be arranged in m rows and one column or in one row and n columns. In this case, the imaging device 100A can be utilized as a line sensor.

In the configuration exemplified in FIG. 1, the peripheral circuitry includes a row scanning circuit 80, a column circuit 82, a signal processing circuit 84, an output circuit 86, and a control circuit 88. The peripheral circuitry may be disposed on the semiconductor substrate on which the pixel array PA is formed, or part of the peripheral circuitry may be disposed on another substrate.

The row scanning circuit 80 is connected to reset control lines $R_i$ and feedback control lines $F_i$. Each of the reset control lines $R_i$ and each of the feedback control lines $F_i$ are provided for the corresponding one of the rows of the pixel array PA. That is, one or more of the pixel cells 10a that belong(s) to the ith row is/are connected to the corresponding reset control line $R_i$ and the corresponding feedback control line $F_i$. Note here that i is 0 to m-1 and m is an integer of 1 or larger.

The row scanning circuit 80 is also connected to address control lines that are not illustrated in FIG. 1. As with the reset control lines $R_i$ and the feedback control lines $F_i$, each of the address control lines is provided for the corresponding one of the rows of the pixel array PA and connected to one or more pixel cells 10a belonging to the corresponding ith row. The row scanning circuit 80 selects each row of pixel cells 10a at a time by applying a predetermined voltage to the corresponding address control line and performs signal voltage readout and the undermentioned reset operation. The row scanning circuit 80 is also referred to as "vertical scanning circuit".

The column circuit 82 is connected to outputs signal lines $S_j$ provided for each column of the pixel array PA. Note here that j is 0 to n-1 and n is an integer of 1 or larger. One or more of the pixel cells 10a that belong(s) to the jth column is/are connected to the corresponding output signal line $S_j$, and output signals from pixel cells 10a selected on a row-by-row-basis by the row scanning circuit 80 are read out to the column circuit 82 via the corresponding output signal lines $S_j$. The column circuit 82 performs noise suppression signal processing, which is typified by correlated double sampling, and analog-digital conversion (AD conversion) on the output signals read out from the pixel cells 10a.

The signal processing circuit 84 performs various types of processing on image signals acquired from the pixel cells 10a. The term "image signals" as used herein refers to those of the output signals read out via the output signal lines $S_j$ which are used for the formation of an image. In the first embodiment, as will be described in detail later, readout of image signals from image cells 10a brought into a high-sensitivity state (such image signals being sometimes referred to as "high-sensitivity signals") and readout of image signals from image cells 10a brought into a low-sensitivity state (such image signals being sometimes referred to as "low-sensitivity signals") are executed. The signal processing circuit 84 forms an image with a wide dynamic range on the basis of these high-sensitivity and low-sensitivity signals. An output from the signal processing circuit 84 is read out to the outside of the external imaging device 100A via the output circuit 86.

The control circuit 88 controls the entirety of the imaging device 100A in receipt of command data, clocks, and the like that are given, for example, from the outside of the imaging device 100A. Typically, the control circuit 88 includes a timing generator, and supplies driving signals to the row scanning circuit 80, the column circuit 82, and the like.

Figure 2:
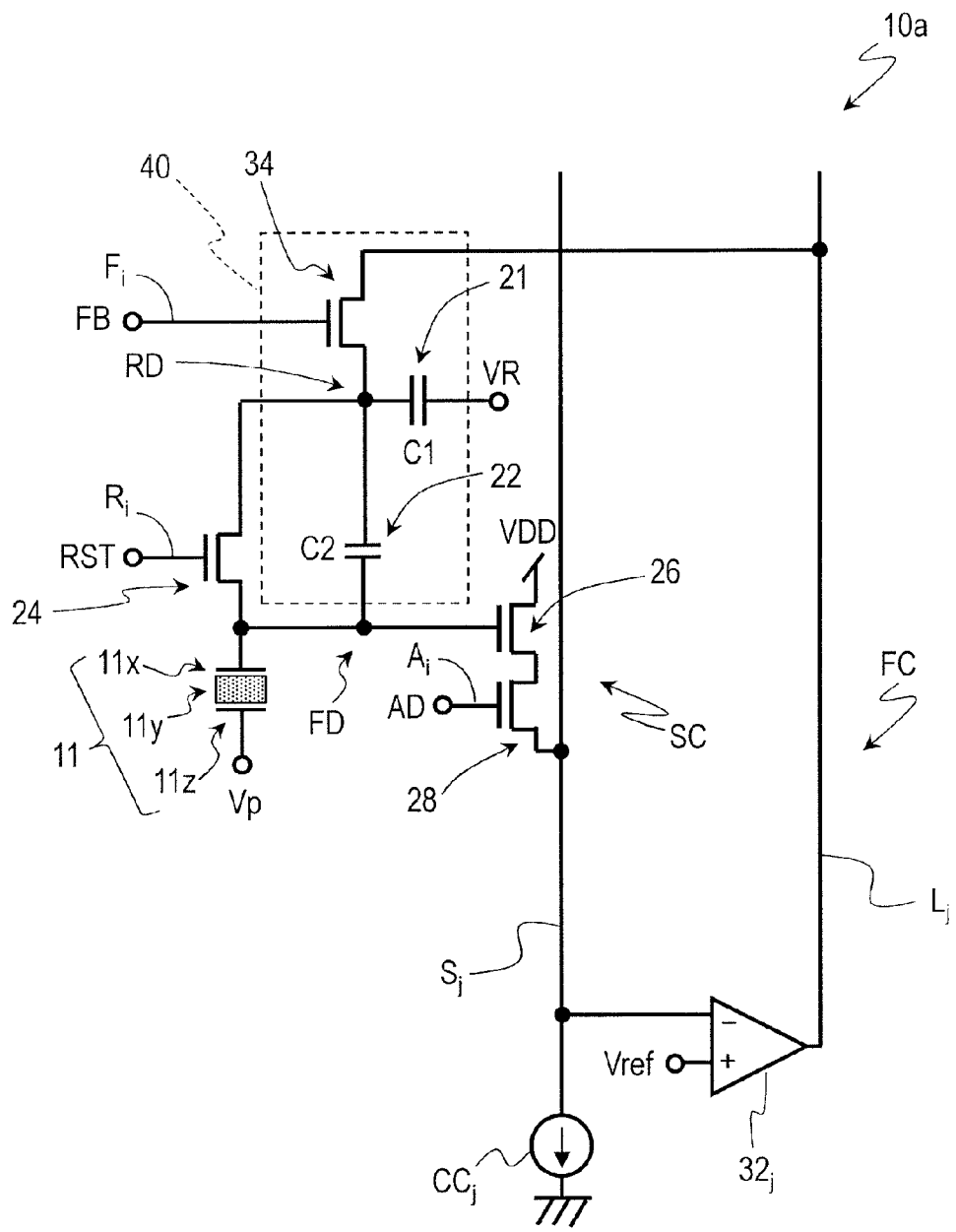
FIG. 2 is a schematic circuit diagram showing an exemplary circuit configuration of a pixel cell.

FIG. 2 shows an exemplary circuit configuration of each of the pixel cells 10a. FIG. 2 picks out and shows the pixel cell 10a in the jth column that belongs to the ith row of the pixel array PA. As shown in FIG. 2, the pixel cell 10a includes a photoelectric converter 11 and a signal detection circuit SC that detects an electrical signal generated in the photoelectric converter 11.

The signal detection circuit SC includes a first capacitor 21, a reset transistor 24, and a signal detection transistor 26. In this example, the signal detection circuit SC includes an address transistor 28. Typically, the reset transistor 24, the signal detection transistor 26, and the address transistor 28 are field-effect transistors (FETs) formed on the semiconductor substrate. Unless otherwise noted, the following describes an example in which N-channel MOS transistors are used. It should be noted that the semiconductor substrate is not limited to a substrate made entirely of a semiconductor but may be an insulated substrate having a semiconductor layer provided on a surface thereof on which an imaging region is formed.

The photoelectric converter 11 generates a signal according to illuminance in response to light falling thereupon. The photoelectric converter 11 is illustrated here by an example in which it is structured such that a photoelectric conversion layer 11y is interposed between a pixel electrode 11x and a counter electrode 11z. In this case, typically, an interlayer insulating layer is provided on the semiconductor substrate on which the aforementioned reset transistor 24 and the like are formed, and the photoelectric converter 11 is disposed on this interlayer insulating layer. That is, the imaging device 100A may be a so-called stacked imaging device that has the photoelectric conversion layer on top of the semiconductor substrate. The following describes an example in which the imaging device 100A is a stacked imaging device. Of course, the photoelectric converter 11 may be a photodiode formed on the semiconductor substrate. In that case, a transfer transistor may be provided between the photoelectric converter 11 and the undermentioned charge storage node FD. After charges generated in the photoelectric converter 11 have been transferred to the charge storage node FD via the transfer transistor, operations that are described in the embodiments below can be applied.

In the photoelectric converter 11, the pixel electrode 11x is disposed on the interlayer insulating layer covering the aforementioned reset transistor 24 and the like. Such pixel electrodes 11x are provided for each separate pixel cell 10a. Typically, the pixel electrode 11x of each pixel cell 10a is electrically separated from the pixel electrodes 11x of other adjacent pixel cells 10a by being spatially separated from the pixel electrodes 11x of the other adjacent pixel cells 10a. The pixel electrode 11x is made of a metal such as aluminum or copper, a metal nitride, or polysilicon rendered electrically conductive by being doped with impurities.

The photoelectric conversion layer 11y is made of an organic material or an inorganic material such as amorphous silicon and generates positive and negative charges (hole-electron pairs) by photoelectric conversion. Typically, the photoelectric conversion layer 11y is formed across the plurality of pixel cells 10a. The photoelectric conversion layer 11y may include a layer made of an organic material and a layer made of an inorganic material.

The counter electrode 11z, which faces the pixel electrode 11x via the photoelectric conversion layer, is an electrode made of a transparent electrically-conductive material such as ITO and is disposed on a light incident side of the photoelectric conversion layer 11y. Typically, as with the photoelectric conversion layer 11y, the counter electrode 11z is formed across the plurality of pixel cells 10a.

During operation of the imaging device 100A, a predetermined voltage Vp is applied to the counter electrode 11z. The formation of the counter electrode 11z across the plurality of pixel cells 10a allows the voltage Vp to be applied to the plurality of pixel cells 10a en block. Different voltages may be supplied as such voltages Vp to each separate pixel block composed of several pixel cells 10a. The supply of the different voltages to each separate pixel block allows variations in sensitivity from one pixel block to another. The voltage Vp may be supplied from either the row scanning circuit 80 (see FIG. 1) or another power source circuit.

The application of the voltage Vp to the counter electrode 11z allows the pixel electrode 11x to collect either the holes or electrons produced in the photoelectric conversion layer 11y. In a case where the holes are used as signal charges, it is only necessary to make the counter electrode 11z higher in potential than the pixel electrode 11x. In a case where the holes are used as signal charges, a voltage, for example, of approximately 10 V is applied as the voltage Vp to the counter electrode 11z. The following takes the holes as examples of signal charges. Alternatively, the electrons may be utilized as signal charges.

The photoelectric converter 11 and the signal detection circuit SC are electrically connected to each other via a wiring layer provided in the interlayer insulating layer. As shown in FIG. 2, the pixel electrode 11x and the gate of the signal detection transistor 26 are connected to each other here. The signal charges collected by the pixel electrode 11x are stored in the charge storage node (also referred to as "floating diffusion node") FD, which is a node between the pixel electrode 11x and the gate of the signal detection transistor 26. Therefore, a voltage corresponding to the amount of signal charge stored in the charge storage node FD is applied to the gate of the signal detection transistor 26.

The signal detection transistor 26 has its source connected to the output signal line $S_j$ via the address transistor 28. The output signal line $S_j$ is connected to a constant current source $CC_j$ constituted by the aforementioned column circuit 82 (see FIG. 1) and the like. The signal detection transistor 26 has its drain connected to a power source wire (source follower power source). The signal detection transistor 26 and the constant current source $CC_j$ connected to the output signal line $S_j$ form a source follower circuit. During operation of the imaging device 100A, the signal detection transistor 26 has its drain supplied with a power source voltage VDD (e.g. approximately 3.3 V) and thereby amplifies the voltage applied to the gate. In other words, the signal detection transistor 26 amplifies a signal produced by the photoelectric converter 11.

The voltage amplified by the signal detection transistor 26 is selectively read out as a signal voltage via the address transistor 28. As illustrated, the address transistor 28 has its gate connected to an address control line $A_i$, and such address control lines $A_i$ are provided for each row of the pixel array PA. The address control line $A_i$ is typically connected to the row scanning circuit 80 (see FIG. 1), and the row scanning circuit 80 can control the tuning on and turning off of the address transistor 28 by controlling a voltage AD that is applied to the address control line $A_i$.

As mentioned above, the signal detection circuit SC includes the first capacitor 21 and the reset transistor 24. One of the source and drain of the reset transistor 24 is connected to the charge storage node FD, and the other of the source and drain of the reset transistor 24 is connected to a first electrode of the first capacitor 21. For convenience of explanation, a node between the reset transistor 24 and the first capacitor 21 may be hereinafter referred to as "reset drain node RD".

During operation of the imaging device 100A, a reference potential VR (e.g. 0 V) is applied to a second electrode of the first capacitor 21. The reference potential VR may be applied by either the row scanning circuit 80 (see FIG. 1) or another power source circuit.

The first capacitor 21 has a comparatively large capacitance C1. The first capacitor 21 may have either an MIS (metal-insulator-semiconductor) structure or an MIM (metal-insulator-metal) structure. Employment of an MIM structure makes it easy to achieve a larger capacitance. It should be noted that the term "capacitor" as used herein means a structure in which a dielectric such as an insulator film is interposed between electrodes. The term "electrode"

as used herein is not limited to an electrode made of a metal but is interpreted to encompass a polysilicon layer and the like. The "electrode" as used herein may be part of the semiconductor substrate.

In the configuration exemplified in FIG. 2, the signal detection circuit SC further includes a second capacitor 22 connected in parallel to the reset transistor 24. It should be noted that the second capacitor 22 is not essential from the point of view of individually acquiring a low-sensitivity signal and a high-sensitivity signal while performing exposure only once. However, since the parallel connection of the second capacitor 22 to the reset transistor 24 can improve the effect of the undermentioned noise cancellation, it is more advantageous, from the point of view of noise reduction, for the signal detection circuit SC to include the second capacitor 22.

The second capacitor 22 has a capacitance C2 that is smaller than the capacitance C1 of the first capacitor 21. Typically, the capacitance C2 is sufficiently smaller than the capacitance C1. The ratio (C2/C1) of the capacitance C2 of the second capacitor 22 to the capacitance C1 of the first capacitor 21 may for example be approximately 1/10. The second capacitor 22 may have either an MIS structure or an MIM structure. The first capacitor 21 and the second capacitor 22 do not need to be identical in structure to each other, either.

The reset transistor 24 has its gate connected to a reset control line $R_i$ connected to the row scanning circuit 80. Therefore, by controlling a voltage RST that is applied to the reset control line $R_i$, the row scanning circuit 80 can switch between the turning on and turning off of the reset transistor 24 of the pixel cell 10a connected to the reset control line $R_i$. The turning off of the reset transistor 24 allows a capacitive circuit in which the first capacitor 21 and the second capacitor 22 are connected in series to be formed between the charge storage node FD and the reference potential VR in the pixel cell 10a. In the first embodiment, as will be mentioned later, readout of a signal in a state where the reset transistor 24 is off and readout of a signal in a state where the reset transistor 24 is on are executed in one frame period. This makes it possible to acquire a high-sensitivity signal and a low-sensitivity signal in sequence. It should be noted that the term "in sequence" as used herein means not being simultaneous.

In this example, the imaging device 100A includes a feedback circuit FC. The feedback circuit FC includes an inverting amplifier $32_j$, and such inverting amplifiers $32_j$ are provided for each column of the pixel array PA in correspondence with the respective output signal lines $S_j$. The inverting amplifier $32_j$ may be part of the aforementioned peripheral circuitry.

As illustrated, the inverting amplifier $32_j$ has its inverting input terminal connected to an output signal line $S_j$ connected to the one or more pixel cell 10a belonging to the jth column. Meanwhile, during operation of the imaging device 100A, the non-inverting input terminal is supplied with a predetermined voltage (e.g. 1 V or a positive voltage of approximately 1 V) Vref. This voltage Vref is utilized as a reference voltage in a reset. The inverting amplifier $32_j$ has its output terminal connected to a feedback wire $L_j$.

In the illustrated example, the pixel cell 10a includes a feedback transistor 34 one of whose source and drain is connected to the reset drain node RD. The feedback wire $L_j$ is connected to the other of the source and drain of the feedback transistor 34. As illustrated, the feedback transistor 34 has its gate connected to a feedback control line $F_i$ connected to the row scanning circuit 80. Therefore, the row scanning circuit 80 can switch between the turning on and turning off of the feedback transistor 34 by controlling a voltage FB that is applied to the feedback control line $F_i$. The voltage FB, which is applied to the feedback control line $F_i$, is not limited to a high-level or low-level voltage but may include a ramp voltage. The term "ramp voltage" widely encompasses voltages whose waveforms substantially rise or substantially fall as time passes. The "ramp voltage" is not limited to a voltage that increases or decreases in a linear fashion but may be a voltage having a stepped waveform, a voltage whose waveform rises or falls with oscillation, or the like.

The turning on of the feedback transistor 34 and the address transistor 28 can form a feedback path through which an electrical signal generated in the photoelectric converter 11 is negatively fed back. That is, the feedback circuit FC can be said to be a circuit that causes an electrical signal generated in the photoelectric converter 11 to be negatively fed back to that one of the source and drain of the reset transistor 24 which is not connected to the charge storage node FD. The feedback transistor 34 and the inverting amplifier $32_j$ constitute part of the feedback path in the feedback circuit FC. The inverting amplifier $32_j$ may be referred to as "feedback amplifier".

The formation of the feedback path enables execution of the undermentioned noise cancellation. In this example, the feedback circuit FC, which negatively feeds back an output from the signal detection circuit SC, includes a band control circuit 40 as part thereof. The band control circuit 40 includes the feedback transistor 34, the first capacitor 21, and the second capacitor 22. During the noise cancellation, the first capacitor 21 and the feedback transistor 34 function as an RC filter circuit. It should be noted that the formation of such feedback paths is executed in sequence on each separate one of the one or more pixel cells 10a connected to the output signal line $S_j$. In other words, the noise cancellation is executed on a row-by-row basis.

Signal Readout Operation according to First Embodiment

Figure 3:
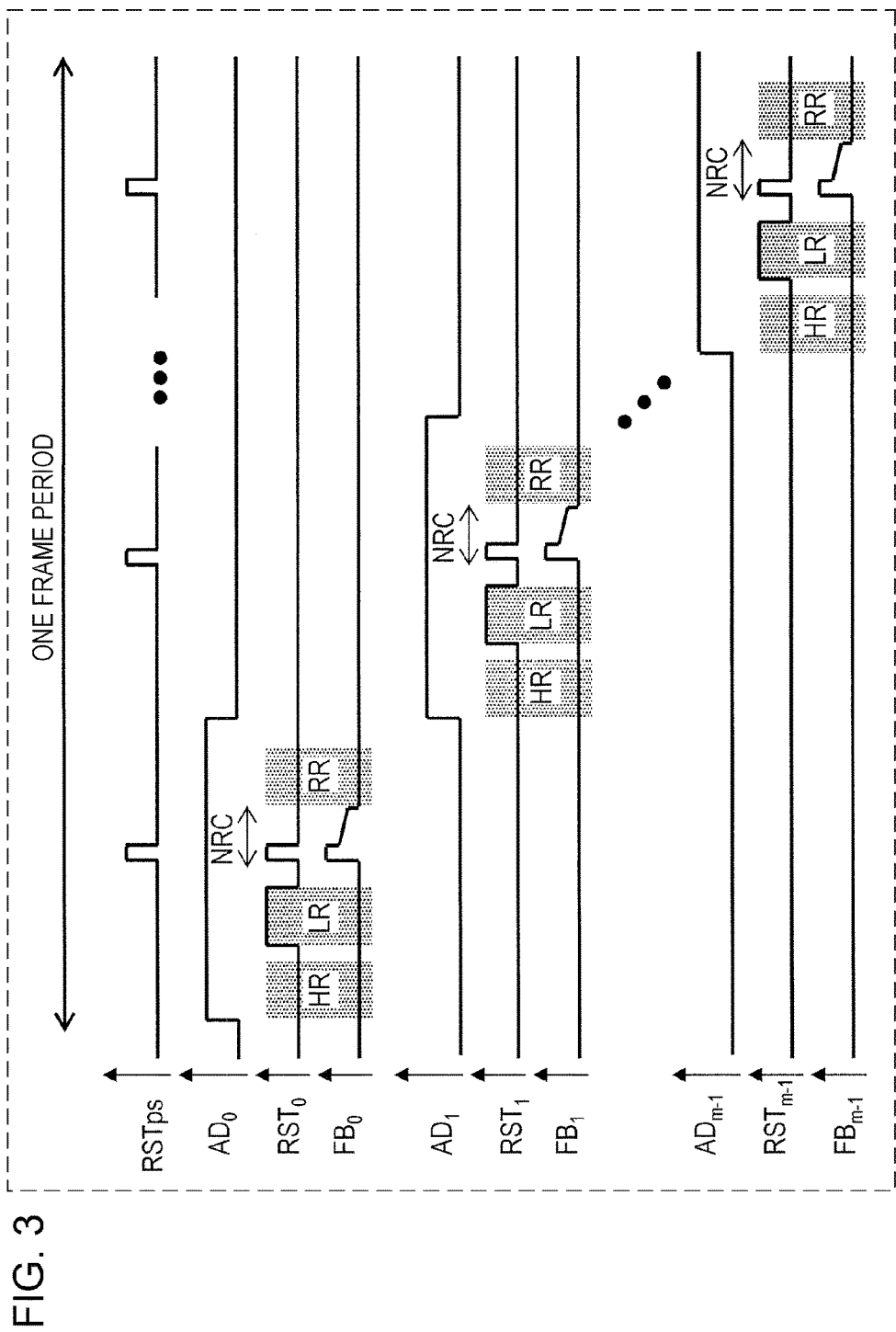
FIG. 3 is a timing chart for explaining a typical example of a signal readout operation according to the first embodiment.

FIG. 3 is a timing chart for explaining a typical example of a signal readout operation according to the first embodiment. In FIG. 3, RSTps represents voltage pulses that designate the start timings of resets in each row of the pixel array PA. $AD_i$, $RST_i$, and $FB_i$ represent changes in voltages that are applied to the address control line $A_i$, the reset control line $R_i$ and the feedback control line $F_i$ in the ith row, respectively. The following describes an example of an operation in which a rolling shutter that performs exposure and signal readout on a row-by-row basis is applied. In FIG. 3, the shaded rectangles HR, LR, and RR represent periods of readout of high-sensitivity signals, low-sensitivity signals, and reset signals, respectively. The double-headed arrows NRC represent periods for reset and noise cancellation after the acquisition of signals. Details of reset and noise cancellation will be described later.

Attention is focused on the zeroth row here. First, prior to exposure and signal readout, the charges stored in the charge storage node FD are reset by the undermentioned reset operation. At this point in time, the undermentioned noise cancellation is executed to reduce kTC noise generated during the reset. After the reset and the noise cancellation, exposure is started. During a period of exposure in the zeroth row, $AD_0$, $RST_0$, and $FB_0$ are all at a low level. That is, the address transistor 28, reset transistor 24, and feedback transistor 34 of each of the pixel cells 10a belonging to the zeroth row are all in an off state. It should be noted that, in order to avoid complexity in illustration, FIG. 3 omits to show preexposure reset and noise cancellation or the following period of exposure.

Exposure causes signal charges (holes here) according to illuminance to be stored in a storage region, including the charge storage node FD, in which signal charges are stored (such a region being hereinafter sometimes referred to as "charge storage region"). After the end of a period of exposure, the row scanning circuit 80 turns on the address transistor 28 by changing $AD_0$ to a high level. The turning on of the address transistor 28 causes a signal according to the amount of charge stored to be read out to the output signal line $S_j$ via the signal detection transistor 26.

In this example, first, readout of a signal in a state where the reset transistor 24 is off is executed. When the reset transistor 24 is off, a capacitive circuit in which the first capacitor 21 and the second capacitor 22 are connected in series is formed between the photoelectric converter 11 and the reference potential. In a state where the reset transistor 24 is off, the capacitance of the whole charge storage region is expressed as (Cfd+(C1C2)/(C1+C2)), where Cfd is the capacitance of a parasitic capacitor of the charge storage node FD. Typically, as mentioned above, the capacitance C2 of the second capacitor 22 is sufficiently smaller than the capacitance C1 of the first capacitor 21. Therefore, in a state where the reset transistor 24 is off, the capacitance of the whole storage region in which signal charges are stored is approximately (Cfd+C2).

In the first embodiment, an image signal that is acquired via the signal detection transistor 26 in a state where the reset transistor 24 is off corresponds to the aforementioned high-sensitivity signal. It should be noted that a period of readout of an image signal may include a period of AD conversion by the column circuit 82 (see FIG. 1). Image data (first image data) corresponding to a high-sensitivity signal is temporarily stored in a buffer memory. The buffer memory is disposed, for example, in the aforementioned column circuit 82 or signal processing circuit 84.

In the first embodiment, readout of a signal in a state where the reset transistor 24 is on is further executed after readout of a signal in a state where the reset transistor 24 is off. After readout of a signal in a state where the reset transistor 24 is off, the row scanning circuit 80 changes $RST_0$ to a high level to turn on the reset transistor 24. The turning on of the reset transistor 24 causes the first capacitor 21 to be connected to the photoelectric converter 11 via the reset transistor 24. The connection of the first capacitor 21 to the photoelectric converter 11 via the reset transistor 24 causes the capacitance of the whole charge storage region to increase from (Cfd+C2) to (Cfd+C1).

After the reset transistor 24 is turned on, an image signal is read out. At this point in time, an image signal that is acquired via the signal detection transistor 26 corresponds to the aforementioned low-sensitivity signal. As can be seen with reference to FIG. 2, readout of the aforementioned high-sensitivity signal is nondestructive readout that does not entail the taking out of signal charges per se from the charge storage node FD. It should be noted that although signal charges are also stored during readout of a high-sensitivity signal, the time required to read out an image signal is sufficiently shorter than the entire period of exposure. This makes it safe to say that a high-sensitivity signal and a low-sensitivity signal are identical in length of period of exposure. Therefore, there is almost no difference in amount of charge stored in the whole charge storage region between readout of a high-sensitivity signal and readout of a low-sensitivity signal.

The capacitance of the whole charge storage region during readout of a low-sensitivity signal is here higher than that during readout of a high-sensitivity signal. This causes the signal detection transistor 26 to become lower in gate voltage and output a signal at a lower level even with the same amount of charge storage. That is, this achieves the same conditions as those under which shooting is performed with the pixel cells 10a at a lower sensitivity. For example, if (Cfd+C2):(Cfd+C1)=1:10, it is possible to achieve a sensitivity ratio of 10:1 between a state where the reset transistor 24 is off (which corresponds to a high-sensitivity state) and a state where the reset transistor 24 is on (which corresponds to a low-sensitivity state).

After readout of a low-sensitivity signal in a state where the reset transistor 24 is on, reset and noise cancellation are executed again. In this example, a reset is executed by turning on the reset transistor 24 and the feedback transistor 34 by changing $RST_0$ and $FB_0$ to a high level and then turning off the reset transistor 24. In the first embodiment, the reset transistor 24 can be said to have a function of switching between outputting a high-sensitivity signal and outputting a low-sensitivity signal from the pixel cell 10a and a function of starting a reset of the charge storage node FD.

Further, in this example, noise cancellation is executed by turning off the reset transistor 24 and then lowering the voltage $FB_0$ from a high level to a low level. After the execution of reset and noise cancellation, a reset signal is acquired by reading out the voltage of the output signal line $S_j$. A period of readout of a reset signal may include a period for AC conversion. The reset signal is utilized in correlated double sampling by the column circuit 82 (see FIG. 1). Correlated double sampling may be executed by the signal processing circuit 84.

As shown in FIG. 3, the aforementioned series of operations is executed on a row-by-row basis. The end of one frame period is marked by the end of readout of reset signals in the last row. The term "one frame period" as used herein is defined as a period from readout of high-sensitivity signals or low-sensitivity signals in the first row (zeroth row here) to the end of readout of reset signals in the last row ((m-1)th row here).

It should be noted that, in the example shown in FIG. 3, the reset transistor 24 is turned off once and turned on again after readout of a low-sensitivity signal. That is, such control is executed here that the reset transistor 24 in each of the pixel cells 10a is turned off twice (or may also be said to be turned off twice) in one frame period. In this manner, such control may be executed that the reset transistor 24 in each of the pixel cells 10a is turned on or off at least twice in one frame period. Alternatively, after readout of a low-sensitivity signal, a reset may be started by turning on the feedback transistor 34 without turning off the reset transistor 24. The turning on and turning off of the reset transistor 24 and the feedback transistor 34 are executed, for example, on the basis of control of the aforementioned control circuit 88 (see FIG. 1).

Image data (first image data) corresponding to high-sensitivity signals and image data (second image data) corresponding to low-sensitivity signals may be combined to form an image (wide dynamic range image) with reduced overexposed whites and blackening phenomenon. The formation of such an image is called "high dynamic range imaging". As a specific method of high dynamic range imaging, a known method may be applied. The first image data and the second image data are combined, for example, by the signal processing circuit 84. It should be noted that the first image data and the second image data may be combined on either a row-by-row basis or a frame-by-frame basis. Execution of row-by-row imaging confines the time difference between readout of high-sensitivity signals and readout of low-sensitivity signals to the length to a 1 H period (time required to scan one row).

Thus, in the first embodiment, each of the pixel cells 10*a* outputs a high-sensitivity signal and a low-sensitivity signal in sequence in one frame period. As is evident from the above description, the first embodiment makes it possible to individually acquire a low-sensitivity signal and a high-sensitivity signal from each pixel cell 10*a* while performing exposure on each pixel cell 10*a* only once in one frame period. In other words, the first embodiment eliminates the need to set a total of two periods of exposure for the acquisition of a high-sensitivity signal and the acquisition of a low-sensitivity signal, respectively. This reduces the occurrence of deterioration in image quality of a wide dynamic range image. This also enables higher operation speeds. This also eliminates the need to perform a reset operation every time a high-sensitivity signal and a low-sensitivity signal are acquired.

Furthermore, with attention focused on each of the pixel cells 10*a* belonging to the same row, the start timing of a period of exposure for the acquisition of a high-sensitivity signal and the start timing of a period of exposure for the acquisition of a low-sensitivity signal coincide with each other, and these periods of exposure are substantially equal in length to each other. Therefore, the first embodiment makes it possible to ensure simultaneity between image data corresponding to a high-sensitivity signal and image data corresponding to a low-sensitivity signal.

Reset and Noise Cancellation

Details of operation in reset and noise cancellation are described here with reference to FIGS. 2 and 3. As mentioned above, a reset is started by turning on the reset transistor 24 and the feedback transistor 34. As can be seen from FIG. 2, the turning on of the reset transistor 24 and the feedback transistor 34 causes the charge storage node FD and the feedback line $L_j$ to be connected via the reset transistor 24 and the feedback transistor 34 to form a feedback path through which a signal from the photoelectric converter 11 is fed back (negatively fed back here). The feedback transistor 34 has a function of switching whether to form the feedback path. The formation of such feedback paths is executed on a row of those of the pixel cells 10*a* connected to the output signal line $S_j$ which are selected by bringing the voltage $AD_i$ of the address control line $A_i$ to a high level.

An electrical connection between the charge storage node FD and the feedback line $L_j$ causes the voltage of the output signal line $S_j$ to converge into the voltage Vref applied to the non-inverting input terminal of the inverting amplifier $32_j$. As the voltage Vref, a power source voltage (e.g. 3.3 V) and a voltage of given magnitude in a range of ground (0 V) may be used.

Next, the reset transistor 24 is turned off. The turning off of the reset transistor 24 generates kTC noise. Therefore, the kTC noise is added to the voltage of the charge storage node FD after the reset.

As can be seen with reference to FIG. 2, during the feedback transistor 34 is on, a feedback path including the charge storage node FD, the signal detection transistor 26, the feedback transistor 34, and the second capacitor 22 is formed. When the feedback path is formed (or when the feedback transistor 34 is not off), a signal that the feedback transistor 34 outputs is attenuated by an attenuating circuit that is formed by the second capacitor 22 and the parasitic capacitor of the charge storage node FD. The rate of attenuation B at this time is expressed as B=C2/(C2+Cfd). Therefore, the kTC noise generated by turning off the reset transistor 24 is suppressed 1/(1+A×B) time, where A is the gain of the feedback circuit FC.

In this example, the voltage of the output signal line $S_j$ immediately before the turning off of the reset transistor 24 (i.e. immediately before the start of noise cancellation) is substantially equal to the voltage Vref applied to the non-inverting input terminal of the inverting amplifier $32_j$. By thus causing the voltage of the output signal line $S_j$ at the start of noise cancellation to be closer to the post-cancellation target voltage Vref, the kTC noise can be canceled in a comparatively short period of time.

The voltage level of the feedback control line $F_i$ immediately after the turning off of the reset transistor 24 is high here. Therefore, the operating band of the feedback transistor 34 immediately after the turning off of the reset transistor 24 is comparatively wide. When the operating band of the feedback transistor 34 is wide, it is possible to suppress noise at high speed.

Furthermore, the voltage level of the feedback control line $F_i$ is gradually lowered from a high level to a low level here after the reset transistor 24 is turned off. Gradually lowering the potential of the feedback control line $F_i$ from a high level to a low level across the threshold voltage of the feedback transistor 34 causes the feedback transistor 34 to gradually change from an on state into an off state. At this point in time, the resistance of the feedback transistor 34 increases with a drop in the voltage $FB_i$ being applied to the feedback control line $F_i$. The increase in resistance of the feedback transistor 34 narrows the operating band of the feedback transistor 34, thus narrowing the frequency domain of a signal that is fed back. An improved noise suppression effect can be achieved by causing the operating band of the feedback transistor 34 to be sufficiently lower than that of the signal detection transistor 26.

Once the voltage $FB_i$ being applied to the feedback control line $F_i$ reaches a low level, the feedback transistor 34 becomes turned off. That is, the feedback path is lost. When the operating band of the feedback transistor 34 is sufficiently lower than that of the signal detection transistor 26, thermal noise that is generated in the feedback transistor 34 is suppressed $1/(1+A\times B)^{1/2}$ time by the feedback circuit FC. The kTC noise remaining in the charge storage node FD can be reduced by turning off the feedback transistor 34 in a state where the operating band of the feedback transistor 34 is lower than that of the signal detection transistor 26.

Thus, the kTC noise can be reduced by providing the feedback circuit FC. Therefore, a wide dynamic range image can be obtained with reduced noise influence. Further, the first capacitor 21 can be effectively utilized not only to acquire two signals (namely a high-sensitivity signal and a low-sensitivity signal) corresponding to states with different sensitivities but also to cancel noise. It should be noted that, as will be easily understood by persons skilled in the art, a switch between a high-sensitivity signal and a low-sensitivity signal per se can be made even by a circuit configuration without the second capacitor 22. However, as the second capacitor 22 has a sufficiently small capacitance, the use of the second capacitor 22 allows the rate of attenuation B to take on a larger value, thus making it possible to more effectively cancel noise.

Modification of First Embodiment

Figure 4:
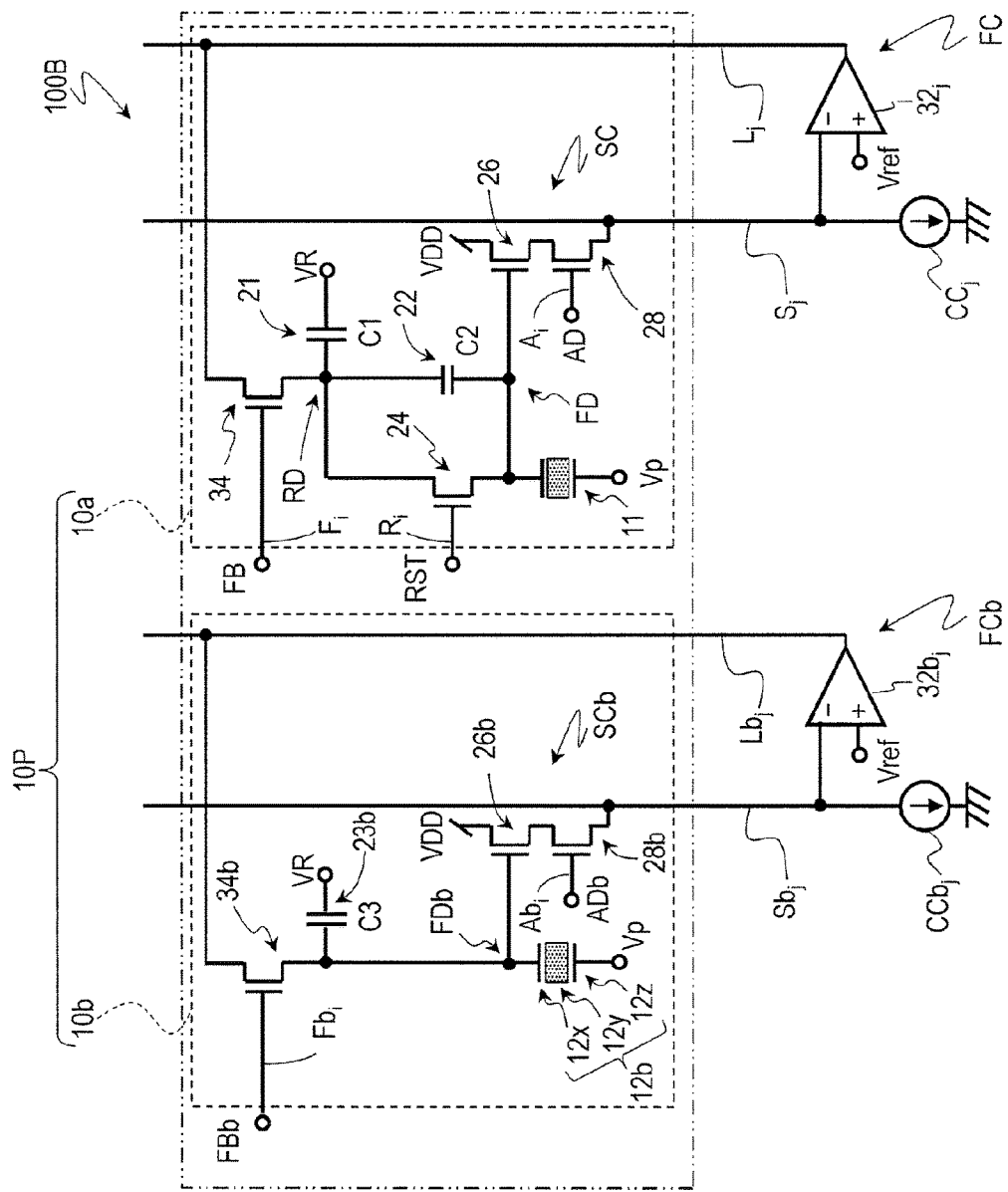
FIG. 4 is a diagram showing a circuit configuration of a modification of an imaging device according to the first embodiment.

FIG. 4 shows a modification of an imaging device according to the first embodiment. A point of difference between an imaging device 100B shown in FIG. 4 and the imaging device 100a described with reference to FIGS. 1 to 3 is that the imaging device 100B includes, in addition to a pixel cell 10a, a second pixel cell 10b that is lower in sensitivity than the pixel cell 10a. As will be described below, the use of the pixel cell 10a and the pixel cell 10b makes it easy to shoot a scene with a wider dynamic range. The pixel cell 10b is hereinafter referred to as "low-sensitivity cell 10b".

In the configuration exemplified in FIG. 4, the pixel cell 10a and the low-sensitivity cell 10b are adjacent to each other along a row direction. The term "row direction" as used herein means a direction in which the rows extend, and the term "column direction" as used herein means a direction in which the columns extend. That is, for example in FIG. 1, the column direction is a direction perpendicular to the paper surface, and the row direction is a direction parallel to the paper surface. In this example, the pixel cell 10a and the low-sensitivity cell 10b, which are adjacent to each other in the same row, constitute a cell pair 10P. The imaging region in the imaging device 100B is formed by arranging a plurality of the cell pairs 10P in a matrix, for example, on the semiconductor substrate. FIG. 4 shows a typical example of a configuration of circuits in the cell pair 10P in the jth column, which is one of the cell pairs 10P belonging to the ith row of the pixel array PA of the imaging device 100B. Alternatively, a cell pair 10P may be formed by arranging a pixel cell 10a and a low-sensitivity cell 10b adjacent to each other along the column direction.

The low-sensitivity cell 10b is schematically similar in configuration to the aforementioned pixel cell 10a. As shown in FIG. 4, the low-sensitivity cell 10b includes a photoelectric converter 12b and a signal detection circuit SCb that detects an electrical signal generated in the photoelectric converter 12b.

The signal detection circuit SCb includes a third capacitor 23b connected between the photoelectric converter 12b and the reference voltage VR and a signal detection transistor 26b. In the example shown in FIG. 4, the signal detection circuit SCb further includes an address transistor 28b. The address transistor 28b is connected between one (source here) of the source and drain of the signal detection transistor 26b and an output signal line $Sb_j$ connected to the column circuit 82 (see FIG. 1).

The photoelectric converter 12b may be similar in configuration to the photoelectric converter 11 of the pixel cell 10a. As with the photoelectric converter 11, the photoelectric converter 12b is illustrated here by an example in which it is structured such that a photoelectric conversion layer 12y is interposed between a pixel electrode 12x and a counter electrode 12z.

Typically, the pixel electrode 12x is disposed on an interlayer insulating layer covering the signal detection transistor 26b, the address transistor 28b, and the like. The pixel electrode 12x is electrically separated from other adjacent pixel electrodes 11x and 12x by being spatially separated from the other adjacent pixel electrodes 11x and 12x. On the other hand, typically, the photoelectric conversion layer 12y of the low-sensitivity cell 10b and the photoelectric conversion layer 11y of the pixel cell 10a are each part of a single continuous photoelectric layer. Further, typically, the counter electrode 12z of the low-sensitivity cell 10b and the counter electrode 11z of the pixel cell 10a are each part of a single continuous electrode.

During operation of the imaging device 100B, the predetermined voltage Vp is applied to the counter electrode 12z of the low-sensitivity cell 10b, as with the counter electrode 11z of the pixel cell 10a. The application of the voltage Vp to the counter electrode 12z allows the pixel electrode 12x to collect either positive or negative charges generated in the photoelectric conversion layer 12y. Different voltages may be supplied, as voltages Vp, to each pixel block composed of several cell pairs 10P.

As shown in FIG. 4, the pixel electrode 12x is connected to the gate of the signal detection transistor 26b. A charge storage node FDb is a node between the pixel electrode 12x and the gate of the signal detection transistor 26b and constitutes at least part of a charge storage region in which signal charges are stored. Therefore, a voltage corresponding to the amount of signal charge stored in the charge storage node FDb is applied to the gate of the signal detection transistor 26b.

As shown in FIG. 4, the low-sensitivity cell 10b includes the third capacitor 23b, which has its first electrode connected to the charge storage node FDb. As with the first capacitor 21 of the pixel cell 10a, the third capacitor 23b has a comparatively large capacitance C3. Typically, the capacitance C3 of the third capacitor 23b is equal to or larger than the capacitance C1 of the first capacitor 21. In this example, no transistor is connected between the photoelectric converter 12b and the third capacitor 23b.

A specific value of the capacitance C3 is set so that the low-sensitivity cell 10b has a lower sensitivity than the pixel cell 10a does in a state where the reset transistor 24 is on, i.e. a low-sensitivity state. As will be mentioned later, the imaging device 100B utilizes a pixel cell 10a whose reset transistor 24 is in an off state as a cell having the highest sensitivity, utilizes a pixel cell 10a whose reset transistor 24 is in an on state as a cell having a moderate sensitivity, and utilizes a low-sensitivity cell 10b as a cell having the lowest sensitivity. The luminance value of a pixel in a wide dynamic range image is determined on the basis of one of three image signals that are acquired from these cells with different sensitivities from one another.

That one of the source and drain (drain here) of the signal detection transistor 26b which is not connected to the address transistor 28b is connected to a power source wire (source follower power source), and is supplied with the power source voltage VDD during operation of the imaging device 100B. The signal transistor 26b and a constant current source $CCb_j$ connected to the output signal line $Sb_j$ form a source follower circuit. That is, the signal detection transistor 26b amplifies a signal produced by the photoelectric converter 12b.

By turning on the address transistor 26b, the signal amplified by the signal detection transistor 26b can be read out to the output signal line $Sb_j$ connected to the constant current source $CCb_j$. As illustrated, the address transistor 28b has its gate connected to an address control line $Ab_i$. Typically, the address control line $Ab_i$ is connected to the row scanning circuit 80 (see FIG. 1). By controlling a voltage ADb that is applied to the address control line $Ab_i$, signals can be read out from low-sensitivity cells 10b selected on a row-by-row basis. The address control line $Ab_i$ may be the same signal line as the address control line $A_i$ connected to the gate of the address transistor 28 of the pixel cell 10a.

In the configuration exemplified in FIG. 4, the imaging device 100B includes a feedback circuit FCb that forms a feedback path through which an electrical signal generated in the photoelectric converter 12b is negatively fed back. As illustrated, the feedback circuit FCb includes an inverting amplifier $32b_j$ having its inverting input terminal connected to the output signal line $Sb_j$ and its output terminal connected to a feedback line $Lb_i$. A feedback transistor 34b is connected between the feedback line $Lb_i$ and the charge storage node FDb.

The feedback transistor 34b has its gate connected to a feedback control line $Fb_i$. By turning on the feedback transistor 34b by controlling a voltage FBb that is applied to the feedback control line $Fb_i$, a feedback path can be formed which includes the feedback transistor 34b and the inverting amplifier $32b_j$ as part thereof. The feedback control line $Fb_i$ may be the same signal line as the feedback control line $F_i$ connected to the gate of the feedback transistor 34 of the pixel cell 10a.

The control of the potential of the feedback control line $Fb_i$ during reset and noise cancellation in the low-sensitivity cell 10b may be substantially the same as the control of the feedback control line $F_i$ during reset and noise cancellation in the pixel cell 10a as described with reference to FIG. 3. A reset in the low-sensitivity cell 10b is started by turning on the feedback transistor 34b. For example, by controlling the potential of the feedback control line $Fb_i$ so that the potential lowers from a high level to a low level, kTC noise that is generated by turning off the feedback transistor 34b can be reduced. It should be noted that since the low-sensitivity cell 10b is set to have a lower sensitivity than the pixel cell 10a does in a low-sensitivity state, the influence of kTC noise on the low-sensitivity cell 10b is smaller than that of kTC noise on the pixel cell 10a. Therefore, the low-sensitivity cell 10b less requires a powerful noise cancellation than the pixel cell 10a. In an aspect, the feedback circuit FCb may be omitted.

The timing of signal readout in the low-sensitivity cell 10b may be substantially the same as the timing of signal readout in the pixel cell 10a as described with reference to FIG. 3. Note, however, that an image signal is read out from each low-sensitivity cell 10b only once in one frame period. For convenience of explanation, an image signal that is obtained from the low-sensitivity cell 10b is referred to as "ultralow-sensitivity signal", as the low-sensitivity cell 10b is set to have a lower sensitivity than the pixel cell 10a does in a low-sensitivity state.

The imaging device 100B makes it possible to acquire three signals, namely a high-sensitivity signal, a low-sensitivity signal, and an ultralow-sensitivity signal, by performing exposure only once on each of the pixel cells 10a and the low-sensitivity cells 10b. That is, the two types of pixel cells bring about an effect which is similar to that which is brought about by disposing three types of cells, namely high-sensitivity, low-sensitivity, and lower-sensitivity cells. The execution of high dynamic range imaging with use of high-sensitivity signals, low-sensitivity signals, and ultralow-sensitivity signals makes it possible to form an image with reduced overexposed whites and blackening phenomenon even in the case of shooting of a scene with a wider dynamic range.

For example, assume that the capacitance of a parasitic capacitor of the charge storage node FDb of the low-sensitivity cell 10b is equal to the capacitance Cfd of the parasitic capacitor of the charge storage node FD of the pixel cell 10a, and assume that C3=C1=Cs. In this case, the capacitance (Cfd+Cs) of the whole charge storage region in the low-sensitivity cell 10b is equal to the capacitance (Cfd+Cs) of the whole charge storage region in the image cell 10a at the time when the reset transistor 24 is on. Assuming here that the ratio between the area of the pixel electrode 12x of the photoelectric converter 12b of the low-sensitivity cell 10b and the area of the pixel electrode 11x of the photoelectric converter 11 of the pixel cell 10a is 1:10, the sensitivity ratio between the sensitivity of the low-sensitivity cell 10b and the sensitivity of the image cell 10a at the time when the reset transistor 24 is on is approximately 1:10. Assuming here that the ratio between the capacitance (Cfd+Cs) of the whole charge storage region in the pixel cell 10a at the time when the reset transistor is on and the capacitance (Cfd+C2) of the whole charge storage region in the pixel cell 10a at the time when the reset transistor is off is 10:1, the sensitivity ratio between the sensitivity of the pixel cell 10a at the time when the reset transistor 24 is on and the sensitivity of the pixel cell 10a at the time when the reset transistor 24 is off is approximately 1:10. As a result, at this point in time, a sensitivity ratio of 1:10:100 is obtained between the sensitivity of the low-sensitivity cell 10b, the sensitivity of the pixel cell 10a at the time when the reset transistor 24 is on, and the sensitivity of the pixel cell 10a at the time when the reset transistor 24 is off. This makes it possible to achieve a wider dynamic range than in a case where no low-sensitivity cell 10b is used. It should be noted that, during operation of the imaging device 100B, a difference in sensitivity between the low-sensitivity cell 10b and the pixel cell 10a may be given by supplying different voltages to the counter electrode 12z of the low-sensitivity cell 10b and the counter electrode 11z of the pixel cell 10a.

In the configuration exemplified in FIG. 4, the influence of kTC noise on an ultralow-sensitivity signal may be reduced, as the imaging device 100B includes the feedback circuit FCb. Furthermore, the imaging device 100B can effectively form a wide dynamic range image, as the low-sensitivity cell 10b acquires ultralow-sensitivity image data and the pixel cell 10a, which is capable of executing a more powerful noise cancellation, acquires high-sensitivity image data and low-sensitivity image data.

Second Embodiment

Figure 5:
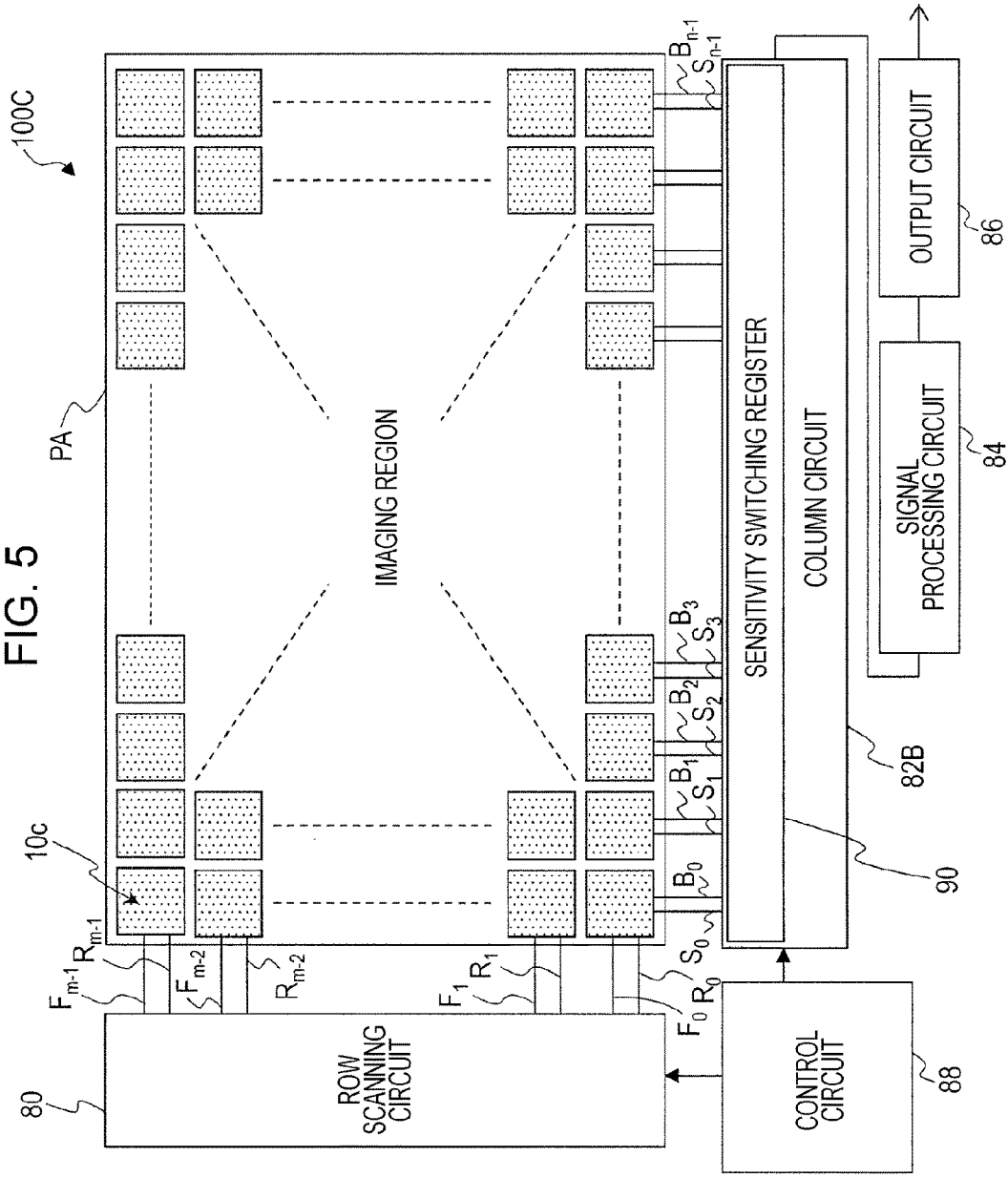
FIG. 5 is a block diagram showing an exemplary configuration of an imaging device according to a second embodiment of the present disclosure.

FIG. 5 shows an exemplary configuration of an imaging device according to a second embodiment of the present disclosure. A main point of difference between an imaging device 100C shown in FIG. 5 and the imaging device 100A shown in FIG. 1 is that the pixel array PA of the imaging device 100C includes a plurality of pixel cells 10c connected to a sensitivity switching register 90. In this example, the sensitivity switching register 90 is disposed in a column circuit 82B.

As with the pixel cells 10a shown in FIG. 1, one or more of the pixel cells 10c that belong(s) to the ith row is/are connected to a reset control line $R_i$ and a feedback control line $F_i$, and such reset control lines $R_i$ and such feedback control lines $F_i$ are provided for each row of the pixel array PA. As with the pixel cells 10a shown in FIG. 1, one or more of the pixel cells 10c that belong(s) to the jth column is/are connected to an output signal line $S_j$, and such output signal lines $S_j$ are provided for each column of the pixel array PA. Furthermore, the one or more pixel cells 10c belonging to the jth column is/are connected to a sensitivity switching line $B_j$ here, and such sensitivity switching lines $B_j$ are provided for each column of the pixel array PA. As illustrated, the sensitivity switching lines $B_j$ are connected to the column circuit 82B.

In the second embodiment, as will be described in detail later, by changing the voltage level of the sensitivity switching line $B_j$, whether to read out a high-sensitivity signal or a low-sensitivity signal from a corresponding pixel cell 10c is determined. The voltage level of the sensitivity switching line $B_j$ is determined by a comparison between a voltage that is read out via the output signal line $S_j$ and a reference voltage. In other words, the sensitivity with which an image signal is read out from each pixel cell 10c is dynamically changed according to the amount of signal charge stored by exposure. An image signal that is read out from each pixel cell 10c in one frame period is either a high-sensitivity signal or a low-sensitivity signal; therefore, high-sensitivity signals and low-sensitivity signals from pixel cells 10c belonging to the same row can be made identical in length of period of exposure. Further, since either a high-sensitivity signal or a low-sensitivity signal is selectively read out from each pixel cell 10c in one frame period, there is basically no need for a process of combining high-sensitivity image data of one frame and low-sensitivity image data of one frame.

Figure 6:
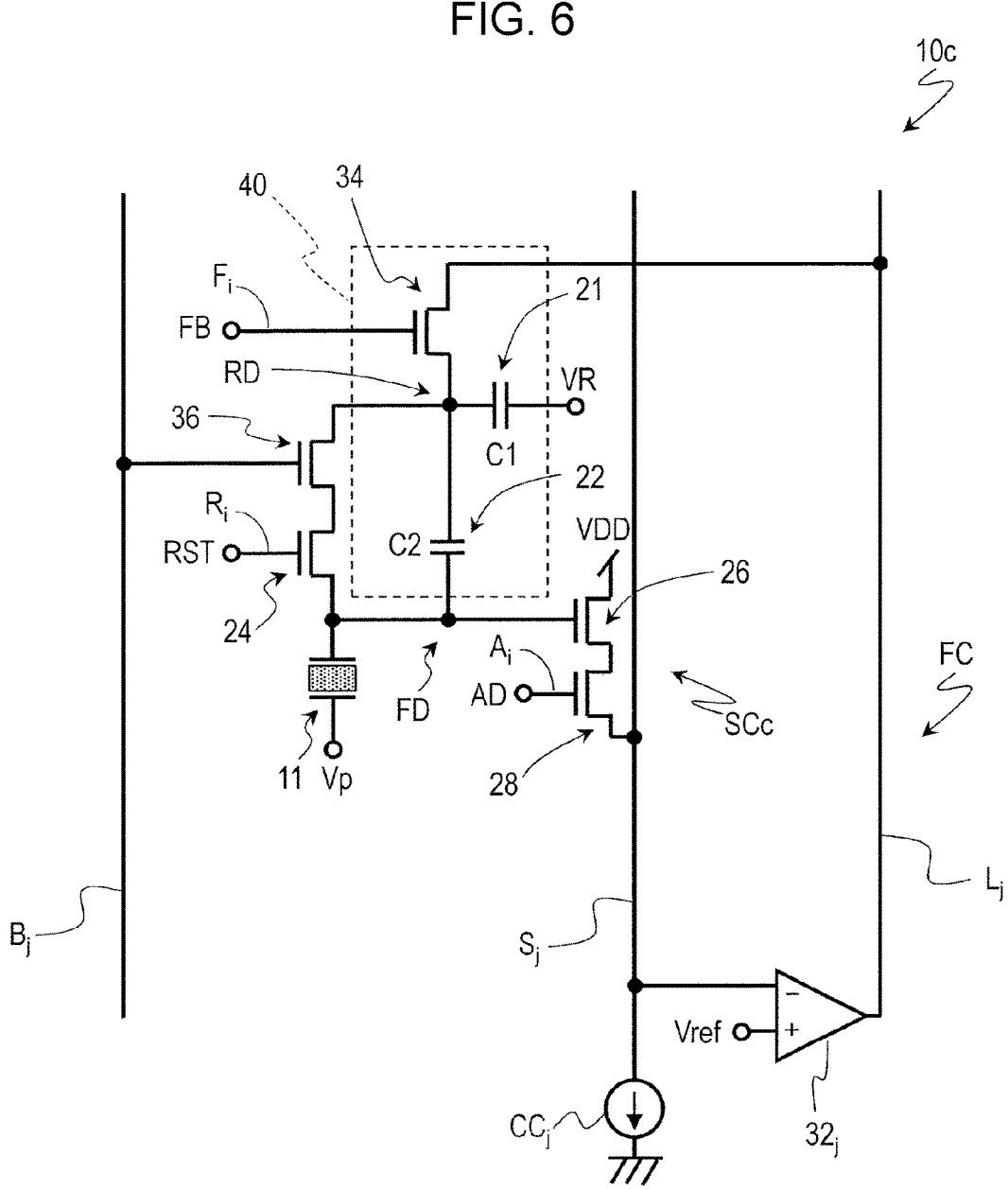
FIG. 6 is a schematic circuit diagram showing an exemplary circuit configuration of a pixel cell shown in FIG. 5.

FIG. 6 shows an exemplary circuit configuration of each of the pixel cells 10c. The low-sensitivity cell 10c is schematically similar in configuration to the pixel cell 10a described with reference to FIG. 2. That is, the pixel cell 10c includes a photoelectric converter 11 and a signal detection circuit SCc that detects an electrical signal generated in the photoelectric converter 11. Note, however, that the signal detection circuit SCc of the pixel cell 10c includes a sensitivity switching transistor 36 at a reset drain node RD.

The sensitivity switching transistor 36 is connected between that one of the source and drain of the reset transistor 24 which is not connected to the photoelectric converter 11 and that one of the electrodes of the first capacitor 21 to which no reference voltage is applied during operation of the imaging device 100C. The sensitivity switching transistor 36 has its gate connected to the corresponding sensitivity switching line $B_j$. For example, the sensitivity switching transistor 36 of a pixel cell 10c belonging to the zeroth column has its gate connected to the sensitivity switching line $B_0$.

In the first embodiment, as previously described, whether to read out a high-sensitivity signal or a low-sensitivity signal from a pixel cell 10a is determined by changing the level of a voltage that is applied to the reset transistor 24. In the first embodiment, a high-sensitivity signal and a low-sensitivity signal are read out in sequence. In the second embodiment, on the other hand, either a high-sensitivity signal or a low-sensitivity signal is selected by controlling, via the sensitivity switching line $B_j$, the level of a voltage that is applied to the gate of the sensitivity switching circuit 36, and the imaging signal is read out in one frame period.

Figure 7:
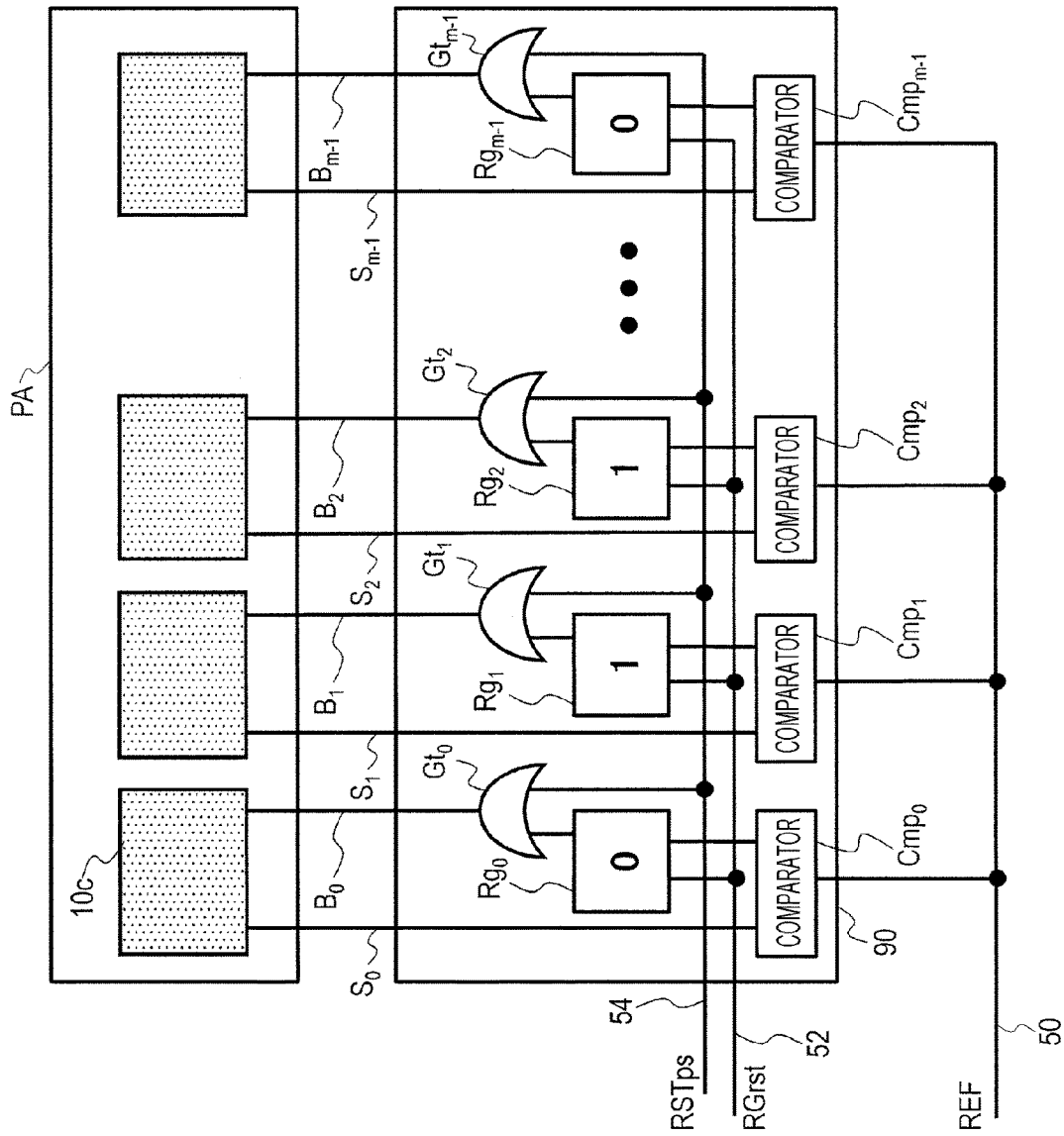
FIG. 7 is a diagram showing a typical example of a circuit configuration of a sensitivity switching register.

FIG. 7 shows a typical example of a circuit configuration of the sensitivity switching register 90. As schematically shown in FIG. 7, the sensitivity switching register 90 includes plural sets provided for each column of the pixel array PA, each set composing of a comparator $Cmp_j$, a register $Rg_j$, and an OR gate $Gt_j$. FIG. 7 represents four sets out of m sets, which correspond to the zeroth, first, second, and (m-1)th columns. For convenience of explanation, FIG. 7 also shows the pixel cells 10c that belong to a certain row in the pixel array PA.

As illustrated, each of the comparators $Cmp_j$ in the sensitivity switching register 90 is connected to a reference voltage line 50. The reference voltage line 50 is connected to a voltage source (not illustrated), and during operation of the imaging device 100C, a predetermined reference voltage REF is applied to the reference voltage line 50. An example of the reference voltage REF is an operating limit voltage that serves as a criterion for determining whether there occurs an overflow of charges in the charge storage node FD.

The comparator $Cmp_j$ in the jth column is connected to the corresponding output signal line $S_j$. The comparator $Cmp_j$ compares the voltage of the output signal line $S_j$ with the reference voltage REF and returns a result of the comparison to the corresponding register $Rg_j$. For example, the comparator $Cmp_j$ outputs a high-level signal in a case where the voltage of the output signal line $S_j$ exceeds the reference voltage REF.

The register $Rg_j$ temporarily holds the result of the comparison between the voltage of the output signal line $S_j$ and the reference voltage REF. For example, "1" is set in a case where the voltage of the output signal line $S_j$ exceeds the reference voltage REF, and "0" is set in a case where the voltage of the output signal line $S_j$ does not exceed the reference voltage REF. It should be noted that, in the configuration exemplified in FIG. 7, each of the registers $Rg_j$ is also connected to a register reset signal line 52. The supply of a predetermined signal to the register reset signal line 52 makes it possible to reset each of the registers $Rg_j$ to an initial state. For example, the result of the comparison as held in each of the registers $Rg_j$ is reset to "0" by bringing, to a low level, a voltage RGrst that is applied to the register reset signal line 52.

The OR gate $Gt_j$ outputs, to the sensitivity switching line $B_j$, the logical sum of the result of the comparison held in the register $Rg_j$ and the voltage level of a reset signal line 54. Voltage pulses that designate the start timings of resets in each row of the pixel array PA are supplied to the reset signal line 54. For example, in FIG. 7, when the voltage level of the reset signal line 54 is low, the voltage level of the corresponding sensitivity switching line $B_0$ becomes low, as "0" is held in the register $Rg_0$. Since the voltage level of the sensitivity switching line $B_0$ is low, the sensitivity switching transistor 36 of the pixel cell 10c belonging to the zeroth column is turned off. At this point in time, the photoelectric converter 11 and the first capacitor 21 are connected via the second capacitor 22 (see FIG. 6), so that the pixel cell 10c is brought into a high-sensitivity state. That is, when the voltage level of the sensitivity switching line $B_j$ is low, a high-sensitivity signal is read out from the corresponding pixel cell 10c.

On the other hand, since "1" is held in the register $Rg_1$, the voltage level of the corresponding sensitivity switching line $B_1$ is high. Therefore, the sensitivity switching transistor 36 of the pixel cell 10c belonging to the first column becomes turned off. When the reset transistor 24 is on, the photoelectric converter 11 and the first capacitor 21 are connected via the reset transistor 24 and the sensitivity switching transistor 36 (see FIG. 6), so that there is an increase in the capacitance of the whole charge storage region. Therefore, an image signal that is read out from the pixel cell 10c belonging to the first column is low-sensitivity signal. Thus, when the voltage level of the sensitivity switching line $B_j$ is high, a low-sensitivity signal is read out from the corresponding pixel cell 10c.

Figure 8:
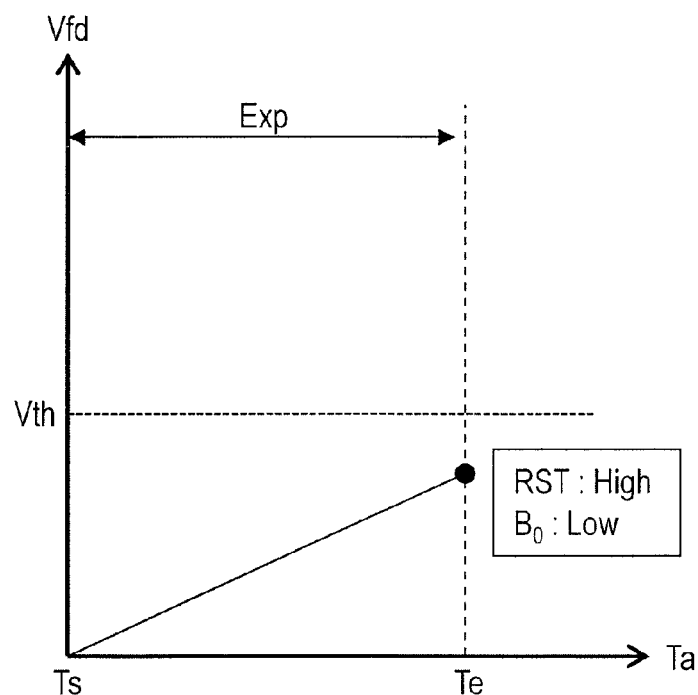
FIG. 8 is a diagram for explaining sensitivity switching in a pixel cell according to a change in voltage of a charge storage node by exposure.
Figure 9:
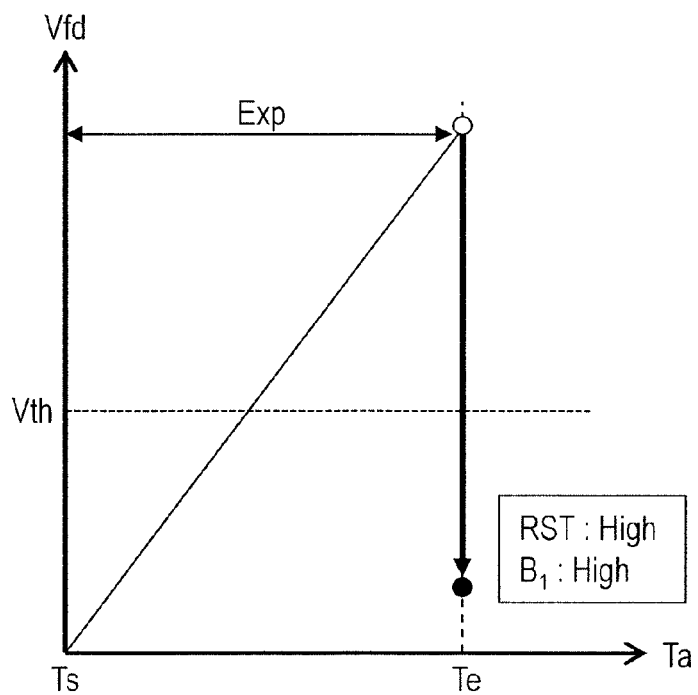
FIG. 9 is a diagram for explaining sensitivity switching in a pixel cell according to a change in voltage of a charge storage node by exposure.

Each of FIGS. 8 and 9 is a diagram for explaining sensitivity switching in a pixel cell 10c according to a change in voltage of the charge storage node FD by exposure. FIG. 8 schematically shows relationship between the time of exposure (time of signal charge storage) and the voltage of the charge storage node FD (i.e. the amount of signal charge stored or the gate voltage of the signal detection transistor 26) in the zeroth column shown in FIG. 7. FIG. 9 schematically shows that relationship between the time of exposure (time of signal charge storage) and the voltage of the charge storage node FD (i.e. the amount of signal charge stored or the gate voltage of the signal detection transistor 26) in the first column shown in FIG. 7. The horizontal and vertical axes of each of the graphs shown in FIGS. 8 and 9 represent the time of exposure Ta and the voltage Vfd of the charge storage node FD, respectively. Ts and Te on the horizontal axis represent the start and end timings of exposure, respectively, and Vth on the vertical axis represents the aforementioned operating limit voltage. The double-headed arrow Exp in each of the graphs represents the period of exposure.

In the pixel cell 10c in the zeroth column, as shown in FIG. 8, the voltage Vfd of the charge storage node FD falls below the operating limit voltage Vth for the entire period of exposure Exp. Accordingly, the voltage level of the corresponding sensitivity switching line $B_0$ is low. Therefore, in the zeroth column, an image signal corresponding to the voltage Vfd is outputted to the output signal line $S_0$. In other words, a high-sensitivity signal is read out from the pixel cell 10c. On the other hand, in the pixel cell 10c in the first column, as shown in FIG. 9, the voltage Vfd of the charge storage node FD exceeds the operating limit voltage Vth at and after some point in the period of exposure. Accordingly, the voltage level of the corresponding sensitivity switching line $B_1$ becomes high, so that the sensitivity switching transistor 36 becomes turned on.

The turning on of the sensitivity switching transistor 36 at the time when the reset transistor 24 is on causes the photoelectric converter 11 and the first capacitor 21 to be connected via the sensitivity switching transistor 36. When either the reset transistor 24 or the sensitivity switching transistor 36 is off, the capacitance of the whole charge storage region is (Cfd+C2), and when both the reset transistor 24 and the sensitivity switching transistor 36 are on, the capacitance of the whole charge storage region is (Cfd+C1). Therefore, when the sensitivity switching transistor 36 changes from being off to being on at the time when the reset transistor 24 is on, the capacitance of the whole charge storage region increases from (Cfd+C2) to (Cfd+C1). For example, if (Cfd+C2):(Cfd+C1)=1:10, the sensitivity switching transistor 36 becomes turned on, so that the voltage Vfd drops to approximately (1/10) as schematically indicated by a downward arrow. That is, a low-sensitivity signal is read out from the pixel cell 10c.

Figure 10:
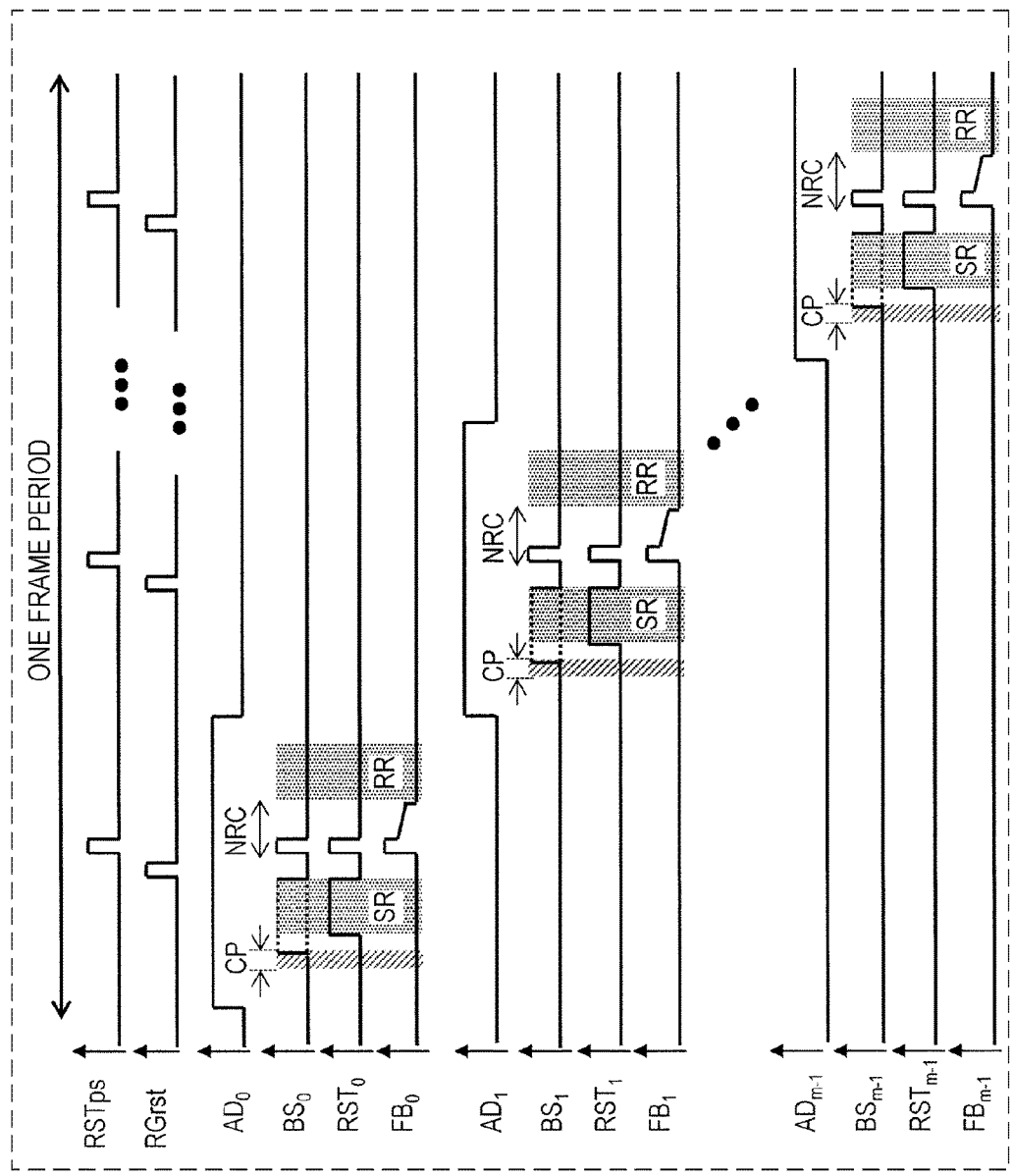
FIG. 10 is a timing chart for explaining a typical example of a signal readout operation according to the second embodiment.

FIG. 10 is a timing chart for explaining a typical example of a signal readout operation according to the second embodiment. In FIG. 10, RGrst represents changes in the voltage that is applied to the register reset signal line 52. $BS_j$ represents changes in a voltage that is applied via the sensitivity switching line $B_j$ to the gate of the sensitivity switching transistor 36 of a pixel cell 10c belonging to the ith row. As in FIG. 3, $AD_i$, $RST_i$, and $FB_i$ represent changes in voltages that are applied to the address control line $A_i$, the reset control line $R_i$, and the feedback control line $F_i$ in the ith row, respectively. In FIG. 10, as in FIG. 3, the shaded rectangles RR represent periods of readout of reset signals, and the double-headed arrows NRC represent periods for reset and noise cancellation after the acquisition of signals.

Attention is focused on the zeroth row. First, prior to exposure and signal readout, the aforementioned reset and noise cancellation are executed. After the reset and the noise cancellation, exposure is started. In the example operation described here, it is assumed that, prior to exposure, "0" is set as an initial value in the register Rgj in each column.

During a period of exposure in the zeroth row, $AD_0$, $RST_0$, and $FB_0$ are all at a low level. That is, the address transistor 28, reset transistor 24, and feedback transistor 34 of each of the pixel cells 10a belonging to the zeroth row are all in an off state. Further, since "0" is set in the register Rgj in each column, the voltage level of the sensitivity switching line $B_j$ in each column is low, and the sensitivity switching transistor 36, too, is in an off state.

After the end of storage of signal charges in the signal charge regions by exposure, the address transistors 28 in the zeroth row are turned on. This causes a signal corresponding to the amount of charge stored to be read out to the output signal line $S_j$ in each column. Each of the comparators $Cmp_j$ in the sensitivity switching register 90 compares the voltage of the corresponding output signal line $S_j$ with the reference voltage REF and returns a result of the comparison to the corresponding register $Rg_j$ (see FIG. 7) This comparison causes "0" to be set in the register $Rg_0$ in the zeroth column and causes "1" to be set in the register $Rg_1$ in the first column, for example. In FIG. 10, the periods with falling diagonal strokes from top left to bottom right which are indicated by the arrows CP represent periods for comparison between the voltage of each output signal line $S_j$ and the reference voltage REF.

The comparison between the voltage of each output signal line $S_j$ and the reference voltage REF causes the voltages that are applied to the sensitivity switching lines $B_j$ provided for each column of the pixel array PA to change according to the values held in the corresponding registers $Rg_j$. In this example, "0" is set in the register $Rg_0$ in the zeroth column. Accordingly, the voltage that is applied to the sensitivity switching line $B_0$ in the zeroth row and the zeroth column remains at a low level (as indicated by a lower dotted line in the graph of the voltage $BS_0$ in FIG. 10). On the other hand, since "0" is set in the register $Rg_1$ in the first column, the voltage that is applied to the sensitivity switching line $B_1$ in the zeroth row and the first column switches to a high level (as indicated by an upper dotted line in the graph of the voltage $BS_0$ in FIG. 10).

After the comparison between the voltage of each output signal line $S_j$ and the reference voltage REF, readout of image signals from the pixel cells 10c is executed. In FIG. 10, the shaded rectangles SR represent periods of readout of image signals from the pixel cells 10c. The readout of image signals is executed with $RST_0$ changed to a high level, i.e. with the reset transistors 24 turned on.

Figure 11:
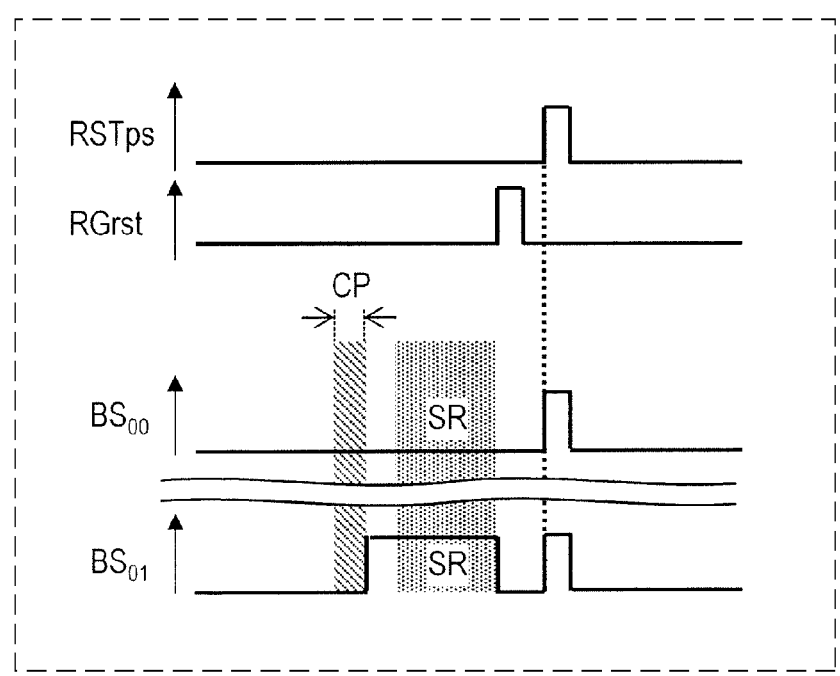
FIG. 11 is a timing chart showing examples of changes in a voltage $BS_{00}$ that is applied to the gate of a sensitivity switching transistor of the pixel cell in the zeroth row and the zeroth column and of changes in a voltage $BS_{01}$ that is applied to the gate of a sensitivity switching transistor of the pixel cell in the zeroth row and the first column.

FIG. 11 shows examples of changes in a voltage $BS_{00}$ that is applied to the gate of the sensitivity switching transistor 36 of the pixel cell 10c in the zeroth row and the zeroth column and of changes in a voltage $BS_{01}$ that is applied to the gate of the sensitivity switching transistor 36 of the pixel cell 10c in the zeroth row and the first column. In FIG. 11, the graphs of the voltages $BS_{00}$ and $BS_{01}$ show typical examples of changes in the voltage that is applied to the sensitivity switching line $B_0$ in the zeroth column and of changes in the voltage that is applied to the sensitivity switching line $B_1$ in the first column, respectively, during selection of the zeroth row.

During the readout of image signals, the voltage $BS_{00}$ being applied to the sensitivity switching line $B_0$ is at a low level here. Therefore, readout of a signal from the pixel cell 10c in the zeroth row and the zeroth column is executed in a state where the sensitivity switching transistor 36 is off, i.e. a high-sensitivity state. That is, a high-sensitivity signal is read out from the pixel cell 10c in the zeroth row and the zeroth column. On the other hand, during the readout of image signals, a high-level voltage is being applied to the sensitivity switching line $B_1$ here. Therefore, readout of a signal from the pixel cell 10c in the zeroth row and the first column is executed in a state where the sensitivity switching transistor 36 is on, i.e. a low-sensitivity state. That is, a low-sensitivity signal is read out. In other words, during readout of a high-sensitivity signal from the pixel cell 10c in the zeroth row and the zeroth column, the pixel cell 10c in the zeroth row and the first column outputs a low-sensitivity signal. Thus, in the second embodiment, even pixel cells 10c belonging to the same row vary from column to column in terms of whether a high-sensitivity signal or a low-sensitivity signal is read out.

After the readout of image signals, the aforementioned reset and noise cancellation are executed at a timing of rising (or falling) of the voltage pulse RSTps. As can be seen with reference to FIG. 7, the OR gate $Gt_j$ in each column has, as its first input, the reset signal line 54 through which the voltage pulse RSTps is supplied. Therefore, by the voltage pulse RSTps being brought to a high level, the sensitivity switching transistors 36 of the pixel cells 10c in each column can be turned on regardless of the result of the comparison held in the register $Rg_j$. That is, with the sensitivity switching transistors 36 turned on at the start of the reset, outputs from the feedback transistors 34 can be supplied to the charge storage nodes FD via the reset transistors 24 and the sensitivity switching transistors 36. After the noise cancellation, reset signals are acquired (periods RR shown in FIG. 10).

The aforementioned series of operations is executed on a row-by-row basis. In this example, as shown in FIG. 11, the voltage RGrst that is applied to the register reset signal line 52 is switched to a high level in a period of time between the readout of image signals and the reset operation. Therefore, each of the registers $Rg_j$ can be reset to an initial state after the readout of image signals from the pixel cells 10c. That is, there may be a difference between the sensitivity with which an image signal is read out from a pixel cell 10c in a given row and a given column and the sensitivity with which an image signal is read out from a pixel cell 10c in a row next to the given row and the given column. For example, a high-sensitivity signal may be read out from the pixel cell 10c in the zeroth row and the zeroth column, and a low-sensitivity signal may be read out from the pixel cell 10c in the first row and the zeroth column.

A final image is formed by image signals obtained from each separate pixel cells 10c. In the second embodiment, the image to be obtained contains a mixture of pixels corresponding to high-sensitivity signals and pixels corresponding to low-sensitivity signals. For example, the presence of a particularly high-luminance portion in a subject automatically lowers the sensitivity with which image signals are read out from pixel cells 10c corresponding to that portion. That is, a wide dynamic range image can be formed without combining high-sensitivity image data of one frame and low-sensitivity image data of one frame. Therefore, the second embodiment makes it possible to shoot a scene with a wide dynamic range without requiring a buffer memory such as a frame memory or a line memory. If needed, luminance level corrections may be made between pixels corresponding to high-sensitivity signals and pixels corresponding to low-sensitivity signals. The imaging device 100C comparatively easily makes luminance corrections on a row-by-row basis, as each of the register $Rg_j$ stores information indicating whether an image signal read out is a high-sensitivity signal or a low-sensitivity signal.

Thus, in the second embodiment, the sensitivity with which an image signal is read out from each pixel cell 10c is dynamically changed on a column-by-column basis according to the amount of signal charge stored in the register $Rg_j$. That is, either a high-sensitivity signal or a low-sensitivity signal is selectively read out from each pixel cell 10c in one frame period according to illuminance. In the second embodiment, readout of an image signal from each pixel cell 10c with AD conversion is executed only once in one frame period. This enables a faster operation than in a case where readout of an image signal is executed twice in one frame period, although a comparison between the voltage of each output signal line $S_j$ and the reference voltage REF is required. Furthermore, as is evident from the example operation described with reference to FIGS. 8 to 11, the second embodiment allows a period of exposure for acquiring a high-sensitivity signal and a period of exposure for acquiring a low-sensitivity signal to be identical in length in the same row of the pixel array PA.

It should be noted that the turning on and turning off of each of the transistors including the sensitivity switching transistors 36 may be executed, for example, on the basis of control of the aforementioned control circuit 88 (see FIG. 1). For example, such control may be executed that, in one frame period, the sensitivity switching transistors 36 of some of the pixel cells 10c in the pixel array PA are turned on and the sensitivity switching transistors 36 of the remaining pixel cells 10c are turned off.

Modification of Second Embodiment

Figure 12:
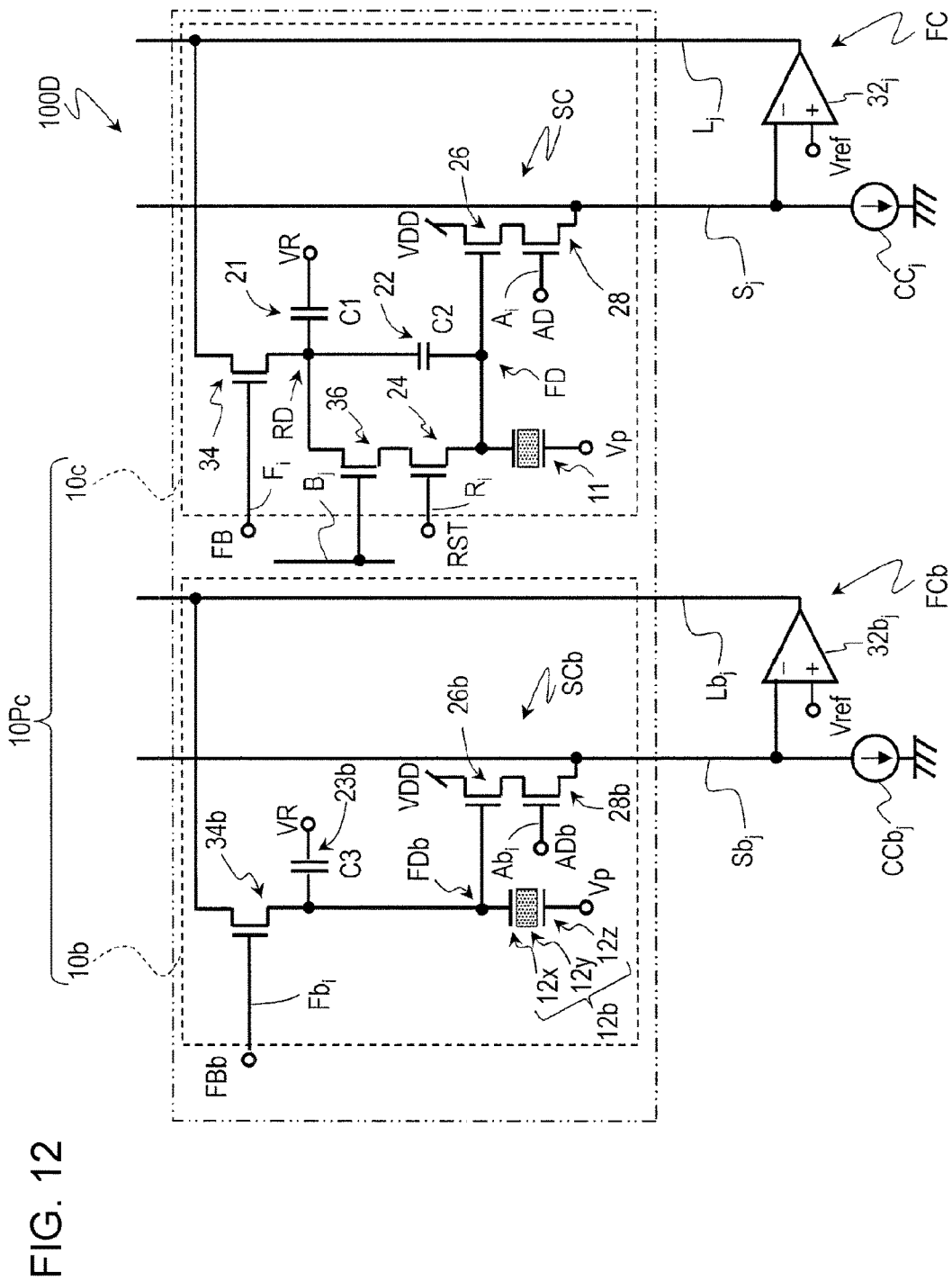
FIG. 12 is a schematic circuit diagram showing a modification of an imaging device according to the second embodiment.

FIG. 12 shows a modification of an imaging device according to the second embodiment. As with the imaging device 100B described with reference to FIG. 4, an imaging device 100D shown in FIG. 12 includes a second pixel cell 10b (low-sensitivity cell 10b) that is lower in sensitivity than the pixel cell 10c. In the configuration exemplified in FIG. 12, the pixel cell 10c and the low-sensitivity cell 10b, which are adjacent to each other along the row direction, constitute a cell pair 10Pc. The imaging region in the imaging device 100D is formed by arranging a plurality of the cell pairs 10Pc in a matrix, for example, on the semiconductor substrate.

The imaging device 100D utilizes a pixel cell 10c whose sensitivity switching transistor 36 is in an off state, a pixel cell 10c whose sensitivity switching transistor 36 and reset transistor 24 are in an on state, and a low-sensitivity cell 10b as a cell having the highest sensitivity, a cell having a moderate sensitivity, and a cell having the lowest sensitivity, respectively. In one frame period, either a high-sensitivity signal or a low-sensitivity signal is read out from each pixel cell 10c according to illuminance during exposure. On the other hand, an ultralow-sensitivity signal is read out from each low-sensitivity cell 10b.

A wide dynamic range image is synthesized on the basis of either high-sensitivity signals or low-sensitivity signals that are acquired from the pixel cells 10c and ultralow-sensitivity signals that are acquired from the low-sensitivity cells 10b. According to the configuration exemplified in FIG. 12, an image signal that is read out from each pixel cell 10c in one frame period is either a high-sensitivity signal or a low-sensitivity signal. This makes it possible to acquire image data of a scene with a wider dynamic range at a higher speed.

Other Modifications

Figure 13:
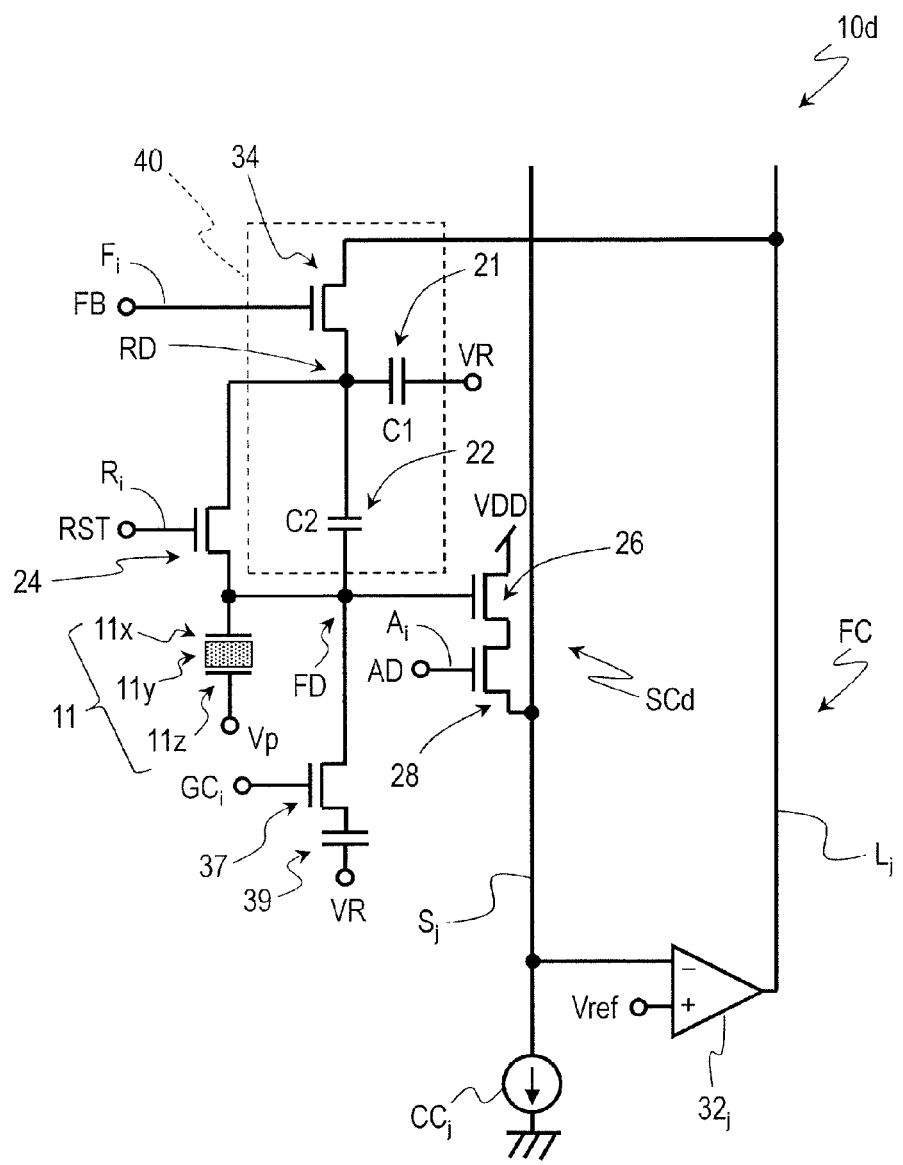
FIG. 13 is a schematic circuit diagram showing a modification of a pixel cell.
Figure 14:
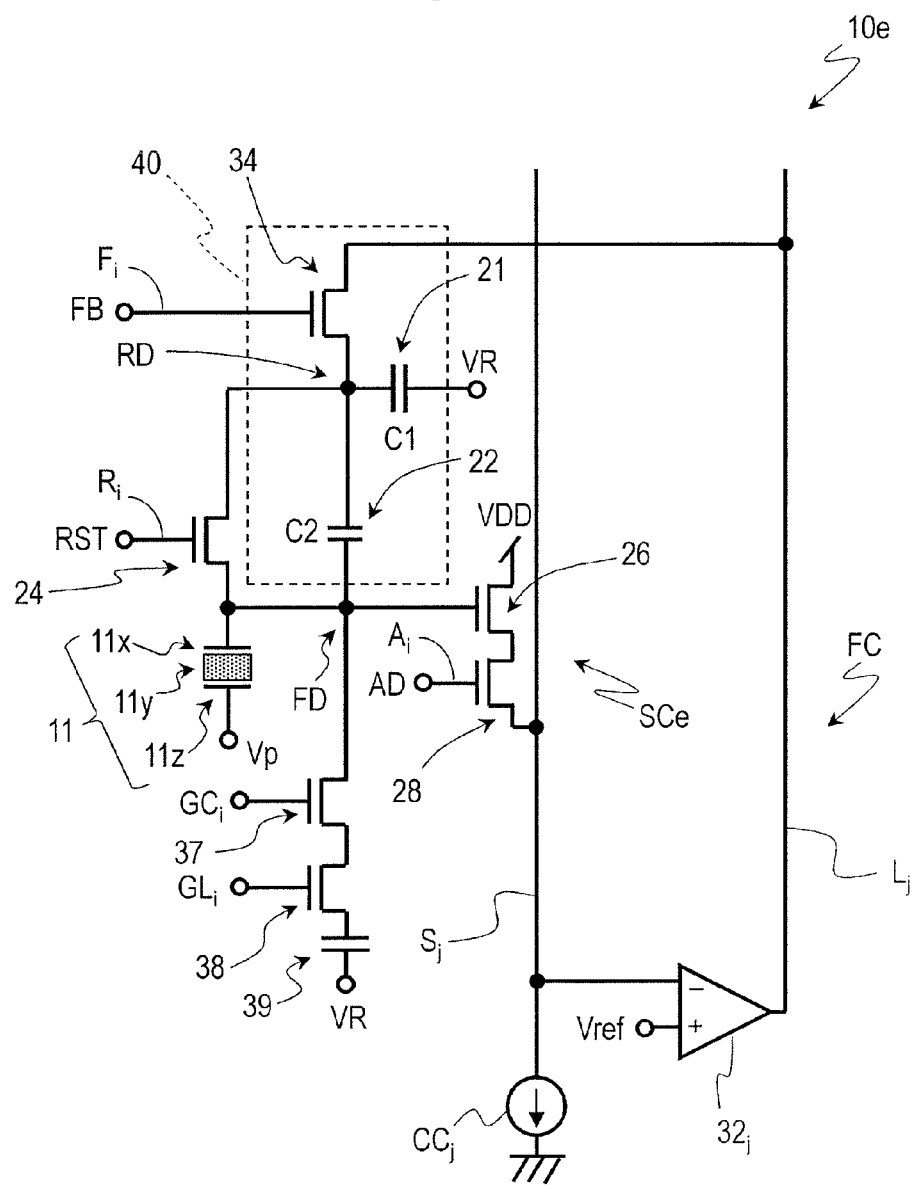
FIG. 14 is a schematic circuit diagram showing another modification of a pixel cell.

FIGS. 13 and 14 show modifications of pixel cells. A pixel cell 10d shown in FIG. 13 includes a signal detection circuit SCd including a capacitor 39 connected to the charge storage node FD via a sensitivity switching transistor 37. As illustrated, the capacitor 39 is connected between one of the source and drain of the sensitivity switching transistor 37 and the reference voltage VR. By controlling the gate voltage $GC_i$ of the sensitivity switching transistor 37, the sensitivity with which an image signal is read out from the pixel cell 10d can be switched on either a row-by-row basis or a column-by-column basis. For example, by tuning on the sensitivity switching transistor 37, a low-sensitivity signal can be read out from the pixel cell 10d.

As in the case of a signal detection circuit SCe of a pixel cell 10e shown in FIG. 14, a second sensitivity switching transistor 38 may be further disposed between the charge storage node FD and the capacitor 39. For example, by controlling the gate voltage $GL_i$ of the sensitivity switching transistor 38 and the gate voltage $GC_i$ of the sensitivity switching transistor 37 on a row-by-row basis and a column-by-column basis, respectively, the sensitivity with which an image signal is read out from the pixel cell 10d can be more flexibly switched. It should be noted that, from the point of view of achieving finer pixels, it is advantageous not to separately provide the capacitor 39 in addition to the first capacitor 21 and the second capacitor 22 but to use a capacitor for both noise cancellation and sensitivity modulation.

Figure 15:
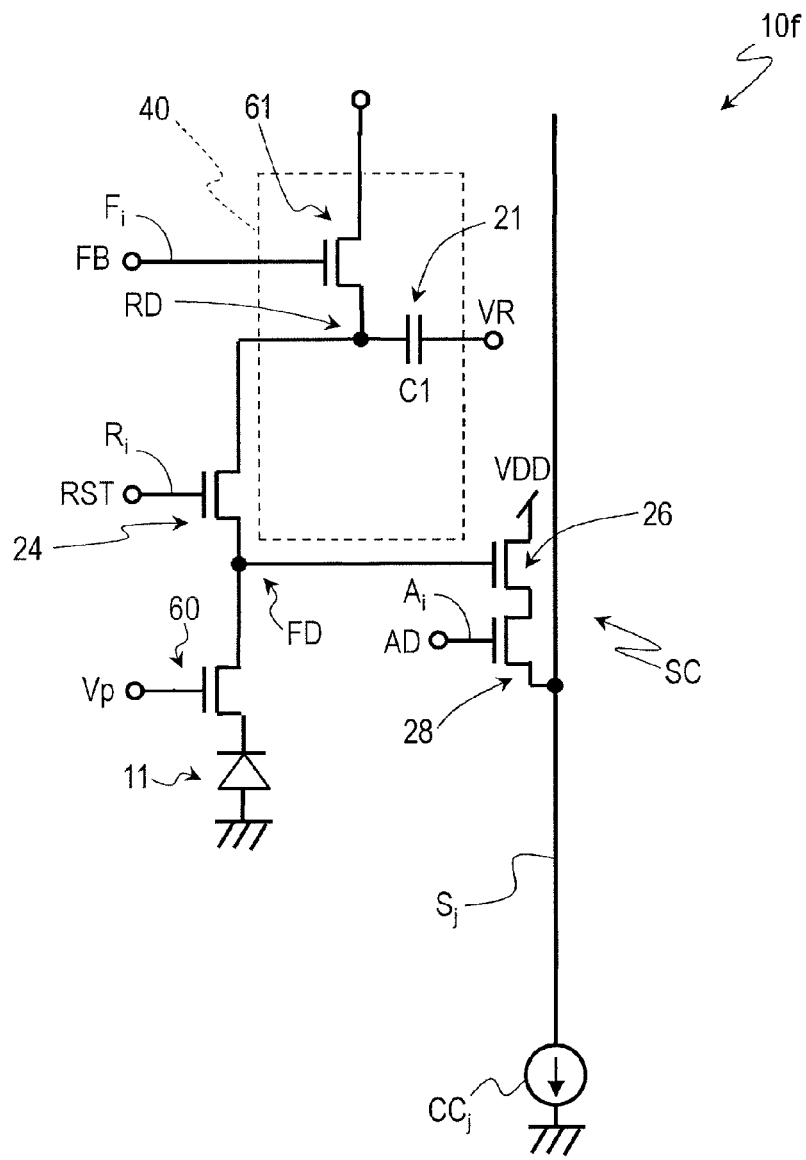
FIG. 15 is a schematic circuit diagram showing still another modification of a pixel cell.

It should be noted that the present disclosure encompasses a case where a photodiode formed on a semiconductor substrate is used, as well as all of the embodiments described above. A pixel cell 10f shown in FIG. 15 is an example in which a photodiode is used as the photoelectric converter 11 in FIG. 2 of the first embodiment. The pixel cell 10f shown in FIG. 15 differs from the pixel cell 10a shown in FIG. 2 in that the pixel cell 10f includes a transfer transistor 60 between the photodiode 11 and the charge storage node FD and that the pixel cell 10f includes no feedback circuit FC or second capacitor 22. Further, in the pixel cell 10f shown in FIG. 15, a predetermined reset voltage is applied to that one of the source and drain of a transistor 61 which is not connected to the first capacitor 21.

In the pixel cell 10f, the supply of a voltage pulse to the gate of the transfer transistor 60 causes charges stored in the photodiode 11 to be transferred to the charge storage node FD via the transfer transistor 60. The operation that follows the transfer is basically the same as that described in the first embodiment, excluding the feedback-related operation.

Figure 16:
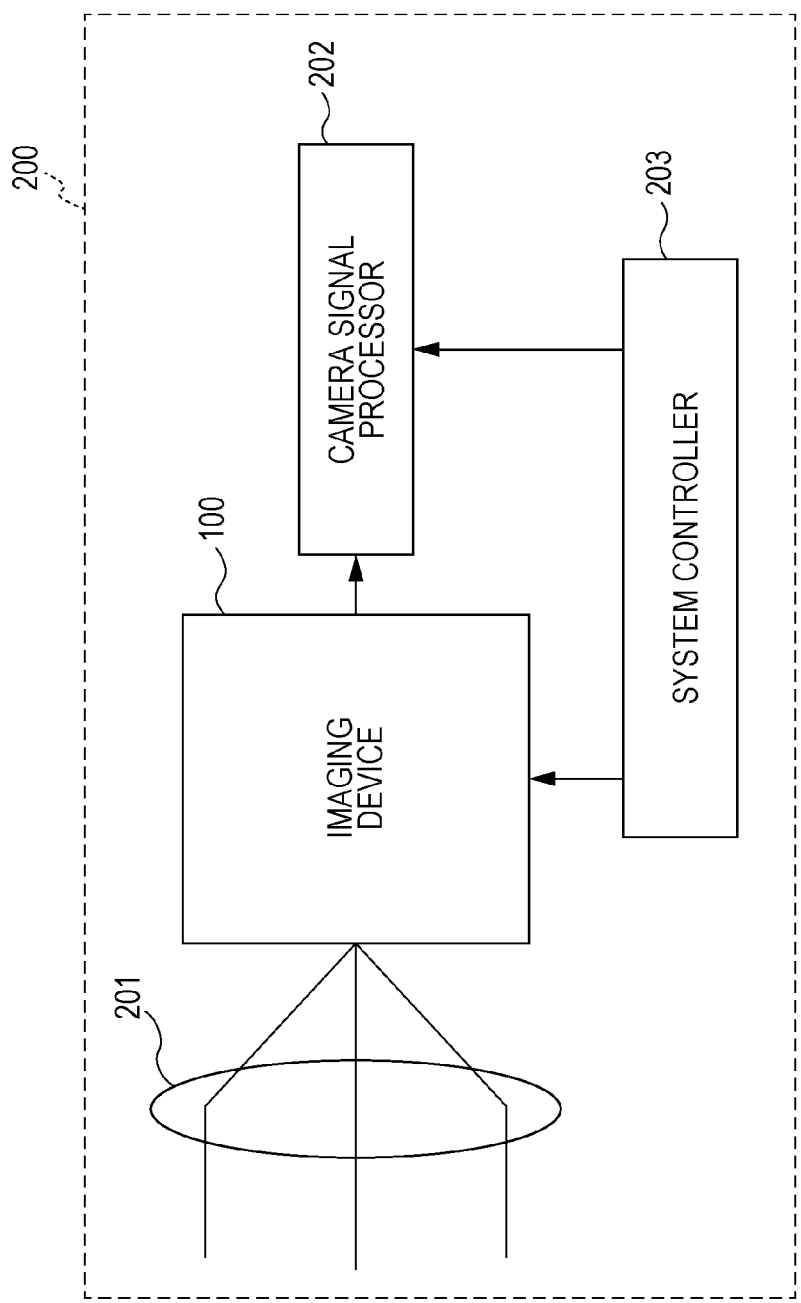
FIG. 16 is a block diagram showing an example configuration of a camera system including an imaging device according to an embodiment of the present disclosure.

FIG. 16 shows an example configuration of a camera system including an imaging device according to an embodiment of the present disclosure. A camera system 200 shown in FIG. 16 includes a lens optical system 201, an imaging device 100, a camera signal processor 202, and a system controller 203. As the imaging device 100, any of the aforementioned imaging devices 100A to 100D can be applied.

The lens optical system 201 for example includes an autofocus lens, a zoom lens, and a diaphragm. The lens optical system 201 concentrates light onto an imaging surface of the imaging device 100. The camera signal processor 202 functions as a signal processing circuit that processes output signals from the imaging devices 100. The camera signal processor 202 executes processes such as gamma correction, color interpolation, spatial interpolation, and automatic white balance and outputs image data (or signals). The camera signal processor 202 may be achieved, for example, by a DSP (digital signal processor) or the like. The system controller 203 controls the entirety of the camera system 200. The system controller 203 may be achieved, for example, by a microcomputer. The application of the aforementioned embodiment as the imaging device 100 makes it possible to acquire image signals with different sensitivities while setting only one period of exposure for each pixel cell, thus making it possible to easily shoot a scene with a wide dynamic range.

It should be noted that each of the aforementioned reset transistor 24, signal detection transistors 26 and 26b, address transistors 28 and 28b, feedback transistors 34 and 34b, and sensitivity switching transistors 36 to 38 may be an N-channel MOS transistor or a P-channel MOS transistor. All of these transistors do not need to be uniformly N-channel MOS transistors or P-channel MOS transistors. As the transistors, bipolar transistors, as well as FETs, may be used.

An imaging device of the present disclosure is useful, for example, in an image sensor, a digital camera, and the like. An imaging device of the present disclosure can be used in a camera for medical use, a camera for use in a robot, a security camera, a camera that is mounted on a vehicle for use, and the like.

What is claimed is:

1. An imaging device comprising a first pixel cell including: a first photoelectric converter that generates a first electrical signal; and a first signal detection circuit that detects the first electrical signal, wherein
the first signal detection circuit includes:
a first transistor having a source and a drain, one of the source and the drain being electrically connected to the first photoelectric converter;
a first capacitor having a first end and a second end, the first end being electrically connected to the other of the source and the drain of the first transistor, a reference voltage being applied to the second end; and
a second transistor having a gate electrically connected to the first photoelectric converter, and
the first pixel cell outputs, in one frame period, a first image signal and a second image signal in sequence, the first image signal being output when the first transistor is off, the second image signal being output when the first transistor is on.

2. The imaging device according to claim 1, further comprising a second pixel cell including: a second photoelectric converter that generates a second electrical signal; and a second signal detection circuit that detects the second electrical signal, wherein
the second signal detection circuit includes:
a second capacitor having a first end and a second end, the first end being electrically connected to the second photoelectric converter, a reference voltage being applied to the second end; and
a third transistor having a gate electrically connected to the second photoelectric converter.

3. The imaging device according to claim 1, wherein
the first signal detection circuit further includes a second capacitor having a first end and a second end, the first end being electrically connected to the first photoelectric converter, the second end being electrically connected to the other of the source and the drain of the first transistor, and
the second capacitor is smaller in capacitance than the first capacitor.

4. The imaging device according to claim 1, further comprising a first feedback circuit that forms a feedback path through which a second electrical signal generated in the first photoelectric converter is negatively fed back.

5. The imaging device according to claim 4, wherein the first feedback circuit negatively feeds back the second electrical signal to the other of the source and the drain of the first transistor.

6. The imaging device according to claim 4, further comprising
a second pixel cell including: a second photoelectric converter that generates a third electrical signal; and a second signal detection circuit that detects the third electrical signal, the second signal detection circuit including:

a second capacitor having a first end and a second end, the first end being electrically connected to the second photoelectric converter, a reference voltage being applied to the second end; and a third transistor having a gate connected to the second photoelectric converter, and a second feedback circuit that forms a feedback path through which a fourth electrical signal generated in the second photoelectric converter is negatively fed back.

7. The imaging device according to claim 6, wherein the second signal detection circuit includes no transistor between the second photoelectric converter and the first end of the second capacitor.

8. An imaging device comprising first pixel cells each including: a first photoelectric converter that generates a first electrical signal; and a first signal detection circuit that detects the first electrical signal, wherein the first signal detection circuit includes:
 a first transistor having a source and a drain, one of the source and the drain being electrically connected to the first photoelectric converter;
 a first capacitor having a first end and a second end, the first end being electrically connected to the other of the source and the drain of the first transistor, a reference voltage being applied to the second end; and
 a second transistor having a gate electrically connected to the first photoelectric converter, and
one of the first pixel cells outputs a first image signal and other one of the first pixel cells outputs a second image signal at a same timing in one frame period, the first image signal being output when the first transistor is off, the second image signal being output when the first transistor is on.

9. An imaging device comprising a first pixel cell including: a first photoelectric converter that generates a first electrical signal; and a first signal detection circuit that detects the first electrical signal, wherein the first signal detection circuit includes:
 a first transistor having a source and a drain, one of the source and the drain being electrically connected to the first photoelectric converter;
 a first capacitor having a first end and a second end, the first end being electrically connected to the other of the source and drain of the first transistor, a reference voltage being applied to the second end; and
 a second transistor having a gate electrically connected to the first photoelectric converter, and the first pixel cell selectively outputs, in one frame period, either a first image signal or a second image signal according to a magnitude of the first electrical signal, the first image signal being output when the first transistor is off, the second image signal being output when the first transistor is on.

10. The imaging device according to claim 9, further comprising a sensitivity switching circuit electrically connected to the first photoelectric converter, wherein the first signal detection circuit further includes a third transistor having a gate connected to the sensitivity switching circuit, the third transistor being connected, in series, to the first transistor, and the sensitivity switching circuit turns on or off the third transistor according to a magnitude of a signal output from the first pixel cell when the first transistor is off.

11. The imaging device according to claim 10, wherein the sensitivity switching circuit includes a comparator that compares a magnitude of the signal output from the first pixel cell when the first transistor is off with a magnitude of a reference signal.

* * * * *